(12) United States Patent (10) Patent No.: US 12,465,848 B2
Suzuki et al. (45) Date of Patent: Nov. 11, 2025

(54) INFORMATION PROCESSING DEVICE, WIRELESS COMMUNICATION TERMINAL, AND INFORMATION PROCESSING METHOD

(71) Applicant: SONY GROUP CORPORATION, Tokyo (JP)

(72) Inventors: Hideyuki Suzuki, Tokyo (JP); Hiromasa Uchiyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 332 days.

(21) Appl. No.: 18/041,958

(22) PCT Filed: Aug. 13, 2021

(86) PCT No.: PCT/JP2021/029789
§ 371 (c)(1),
(2) Date: Feb. 16, 2023

(87) PCT Pub. No.: WO2022/044842
PCT Pub. Date: Mar. 3, 2022

(65) Prior Publication Data
US 2023/0310987 A1 Oct. 5, 2023

(30) Foreign Application Priority Data
Aug. 28, 2020 (JP) .................. 2020-144521

(51) Int. Cl.
*A63F 13/358* (2014.01)
*A63F 13/216* (2014.01)
(Continued)

(52) U.S. Cl.
CPC .......... *A63F 13/358* (2014.09); *A63F 13/216* (2014.09); *A63F 13/332* (2014.09);
(Continued)

(58) Field of Classification Search
CPC ...... A63F 13/65; A63F 13/216; A63F 13/358; A63F 13/335; A63F 13/332; A63F 13/60;
(Continued)

(56) References Cited

U.S. PATENT DOCUMENTS 8,321,527 B2 * 11/2012 Martin .................. H04L 67/62
709/217
8,425,289 B2 * 4/2013 Beggs .................. A63F 13/53
463/43
(Continued)

FOREIGN PATENT DOCUMENTS

JP 2009-153696 A 7/2009
JP 2014-004331 A 1/2014
(Continued)

OTHER PUBLICATIONS

International Search Report and Written Opinion of PCT Application No. PCT/JP2021/029789, issued on Nov. 2, 2021, 09 pages of ISRWO.

*Primary Examiner* — William H McCulloch, Jr.
(74) *Attorney, Agent, or Firm* — CHIP LAW GROUP

(57) ABSTRACT

Provided is an information processing device that transmits and receives data related to a game to and from a wireless communication terminal that executes an application program of the game using a mobile communication system, and changes a story that defines progress of the game according to quality of wireless communication in a communication area in which the wireless communication terminal is present.

12 Claims, 18 Drawing Sheets

(51) Int. Cl.

| | |
|---|---|
| *A63F 13/332* | (2014.01) |
| *A63F 13/335* | (2014.01) |
| *A63F 13/352* | (2014.01) |
| *A63F 13/355* | (2014.01) |
| *A63F 13/45* | (2014.01) |
| *A63F 13/60* | (2014.01) |
| *A63F 13/65* | (2014.01) |
| *A63F 13/92* | (2014.01) |

(52) U.S. Cl.
CPC .......... *A63F 13/335* (2014.09); *A63F 13/352* (2014.09); *A63F 13/355* (2014.09); *A63F 13/45* (2014.09); *A63F 13/60* (2014.09); *A63F 13/65* (2014.09); *A63F 13/92* (2014.09)

(58) Field of Classification Search
CPC ........ A63F 13/92; A63F 13/45; A63F 13/355; A63F 13/352; A63F 13/327; A63F 13/235; A63F 2300/5573; A63F 2300/535; A63F 2300/407; A63F 2300/69; A63F 2300/406; A63F 2300/204; A63F 2300/534
See application file for complete search history.

(56) References Cited

U.S. PATENT DOCUMENTS

| | | | | |
|---|---|---|---|---|
| 9,289,689 | B2* | 3/2016 | Hawver | A63F 13/537 |
| 9,858,832 | B1* | 1/2018 | Hsu-Hoffman | A63F 13/803 |
| 10,398,986 | B1* | 9/2019 | Henroid | A63F 13/795 |
| 10,625,676 | B1* | 4/2020 | Tsimhoni | G05D 1/0088 |
| 10,720,079 | B1* | 7/2020 | Hsu-Hoffman | A63F 13/90 |
| 10,984,657 | B2* | 4/2021 | Galang | G07C 5/0841 |
| 11,023,515 | B2* | 6/2021 | Dazé | H04L 67/75 |
| 11,273,844 | B2* | 3/2022 | Kassner | G09B 19/167 |
| 11,504,622 | B1* | 11/2022 | Sanchez | A63F 13/65 |
| 11,571,622 | B2* | 2/2023 | Mehdi | A63F 13/28 |
| 11,687,530 | B2* | 6/2023 | Krishna | G06F 16/24545 707/718 |
| 2008/0055311 | A1* | 3/2008 | Aleksic | G06T 15/00 345/428 |
| 2010/0287011 | A1* | 11/2010 | Muchkaev | A63F 13/792 706/45 |
| 2012/0052953 | A1* | 3/2012 | Annambhotla | A63F 13/216 463/40 |
| 2012/0053805 | A1* | 3/2012 | Dantu | B60W 40/09 701/70 |
| 2012/0215375 | A1* | 8/2012 | Chang | B60W 50/14 701/1 |
| 2012/0221216 | A1* | 8/2012 | Chauncey | B60W 40/09 701/1 |
| 2013/0316311 | A1* | 11/2013 | England | G09B 19/167 434/65 |
| 2014/0162775 | A1* | 6/2014 | Hawver | A63F 13/95 463/31 |
| 2016/0098339 | A1* | 4/2016 | Masilamani | G06F 1/3212 702/186 |
| 2018/0053433 | A1* | 2/2018 | Dunn | G09B 7/00 |
| 2018/0311573 | A1* | 11/2018 | Pickover | G16H 15/00 |
| 2018/0350144 | A1* | 12/2018 | Rathod | G06Q 20/3224 |
| 2018/0357233 | A1* | 12/2018 | Dazé | H04L 67/561 |
| 2020/0001180 | A1* | 1/2020 | Turner | H04L 67/63 |
| 2020/0184500 | A1* | 6/2020 | Yuyama | B60W 40/09 |
| 2020/0269132 | A1* | 8/2020 | Turner | A63F 13/31 |
| 2020/0302510 | A1* | 9/2020 | Chachek | G06V 20/52 |
| 2021/0178252 | A1* | 6/2021 | LaHorgue | A63F 13/216 |
| 2021/0191940 | A1* | 6/2021 | Krishna | A63F 13/92 |
| 2021/0286838 | A1* | 9/2021 | Dazé | H04L 67/12 |
| 2021/0377696 | A1* | 12/2021 | Hagland | H04L 67/52 |
| 2022/0047951 | A1* | 2/2022 | Mehdi | A63F 13/803 |
| 2022/0143498 | A1* | 5/2022 | Åkerfeldt | A63F 13/352 |
| 2022/0185197 | A1* | 6/2022 | Shimizu | B60R 11/02 |
| 2022/0288495 | A1* | 9/2022 | Endo | B60W 50/14 |
| 2022/0289197 | A1* | 9/2022 | Endo | A63F 13/58 |
| 2022/0292886 | A1* | 9/2022 | Endo | B60K 35/22 |
| 2023/0277939 | A1* | 9/2023 | Walker | A63F 13/58 463/31 |
| 2023/0285862 | A1* | 9/2023 | Walker | A63F 13/49 |
| 2023/0309164 | A1* | 9/2023 | Xu | H04W 28/26 |
| 2023/0310987 | A1* | 10/2023 | Suzuki | A63F 13/358 463/40 |
| 2023/0366973 | A1* | 11/2023 | Walker | G01C 21/005 |
| 2025/0113049 | A1* | 4/2025 | Lee | A63F 13/355 |

FOREIGN PATENT DOCUMENTS

| | | |
|---|---|---|
| JP | 2014-073266 A | 4/2014 |
| JP | 2015-136127 A | 7/2015 |
| JP | 2017-510183 A | 4/2017 |

\* cited by examiner

INFORMATION PROCESSING DEVICE, WIRELESS COMMUNICATION TERMINAL, AND INFORMATION PROCESSING METHOD

CROSS REFERENCE TO RELATED APPLICATIONS

This application is a U.S. National Phase of International Patent Application No. PCT/JP2021/029789 filed on Aug. 13, 2021, which claims priority benefit of Japanese Patent Application No. JP 2020-144521 filed in the Japan Patent Office on Aug. 28, 2020. Each of the above-referenced applications is hereby incorporated herein by reference in its entirety.

TECHNICAL FIELD

The present technology particularly relates to an information processing device, a wireless communication terminal, and an information processing method capable of easily guiding a user to an area where high communication quality can be secured.

BACKGROUND ART

In recent years, as games for portable client terminals such as smartphones and the like, cloud games using position information of users have attracted attention. It is expected that new cloud games in which the real world and the virtual world are fused by utilizing 5G communication, augmented reality (AR) technology, and the like will become widespread.

In order to enable the user to obtain a sense of immersion in a cloud game played while moving, it is required to secure a stable wireless communication path in a high band and transmit video data, sensing information, and the like with a large capacity and a low latency.

It is expected that a network virtualization technology and an edge cloud technology in 5G communication further increase experience quality of cloud games. The network virtualization technology is a technology capable of flexibly and dynamically allocating processing resources of a core network and calculation resources on an edge cloud.

Patent Document 1 discloses a technique of acquiring communication parameters associated with position information and displaying images representing the communication parameters on map information to provide a user with a traffic situation of each communication carrier. After visually confirming the traffic situation, the user can select a communication carrier with less traffic and start connection.

CITATION LIST

Patent Document

Patent Document 1: Japanese Patent Application Laid-Open No. 2015-136127

SUMMARY OF THE INVENTION

Problems to be Solved by the Invention

In general, in a case where a client terminal is used while moving outdoors, a communication environment changes such as attenuation or interference of radio waves, bandwidth tightness due to an increase in the number of users, and the like.

For example, a high frequency band (millimeter wave band) introduced in 5G communication can secure a wide bandwidth, but has high radio wave straightness and a large distance attenuation rate as compared with a low frequency band used in conventional LTE communication. For communication carriers, a large amount of capital investment is required to widely deploy base stations compatible with millimeter waves, and thus, an operation by local deployment in areas with high demand such as a station, a stadium, and a store is expected. As a result, the occurrence of fallback to 4G communication may increase the frequency of occurrence of fluctuations in the transmission band and data packet loss. Therefore, in particular, at the time of streaming of video, there is a possibility that it is not possible to follow the fluctuations in communication quality, and image disturbance or the like may occur due to non-transmission of a high-frequency component. Furthermore, the occurrence of frame skip/frame repeat due to packet loss may degrade game experience quality including operability.

Moreover, although the network resources can be flexibly allocated by the above-described network virtualization technology or the like, it is difficult for the service provider to recognize in advance any behavior of the users and allocate necessary resources to all the users.

The present technology has been made in view of such a situation, and an object thereof is to easily guide a user to an area where high communication quality can be secured.

Solutions to Problems

An information processing device according to one aspect of the present technology includes: a communication unit that transmits and receives data related to a game to and from a wireless communication terminal that executes an application program of the game using a mobile communication system; and a game provision control unit that changes a story that defines progress of the game according to quality of wireless communication in a communication area in which the wireless communication terminal is present.

A wireless communication terminal according to another aspect of the present technology includes: a communication unit that transmits and receives data related to a game to and from an information processing device that manages provision of the game using a mobile communication system; and a game execution control unit that progresses the game defined by a story after a change according to the change of the story performed by the information processing device according to quality of wireless communication used for transmission and reception of the data related to the game.

In one aspect of the present technology, data related to a game is transmitted and received to and from a wireless communication terminal that executes an application program of the game using a mobile communication system, and a story that defines progress of the game is changed according to quality of wireless communication in a communication area in which the wireless communication terminal is present.

In another aspect of the present technology, transmission and reception of data related to a game are performed with an information processing device that manages provision of the game using a mobile communication system, and the game defined by a story after a change progresses according to the change of the story performed by the information processing device according to quality of wireless communication used for transmission and reception of the data related to the game.

MODE FOR CARRYING OUT THE INVENTION

<<Outline of Present Technology>>

The present technology enables dynamic change of experience quality of a user related to a game using a mobile communication system by control of a server side that provides the game. The game provided by the server is, for example, a game that the user plays while moving using the position information of the client terminal used by the user. In conjunction with the movement of the user, the position of the user in the game space moves, and the game proceeds.

The experience quality of the game is changed, for example, by changing a story that defines the progress of the game and moving the user to a position in the communication area where high communication quality can be secured. The experience quality of the game changes depending on the communication quality of wireless communication and the like.

As described above, the proposal for the movement to another communication area is not directly given to the user, but is indirectly given such that the user moves to a communication area where high communication quality can be secured as a result of the movement according to the change of the story of the game.

The server can guide the user to an area where high communication quality can be secured in a natural manner, and the experience quality of the game can be improved.

Hereinafter, modes for carrying out the present technology will be described. The description will be given in the following order.

1. Cloud Game System
2. Processing of Entire Cloud Game System
3. Processing of Each Node
4. Configuration of Each Device
5. Modifications <<Cloud Game System>>
<Configuration of Cloud Game System>

Figure 1:
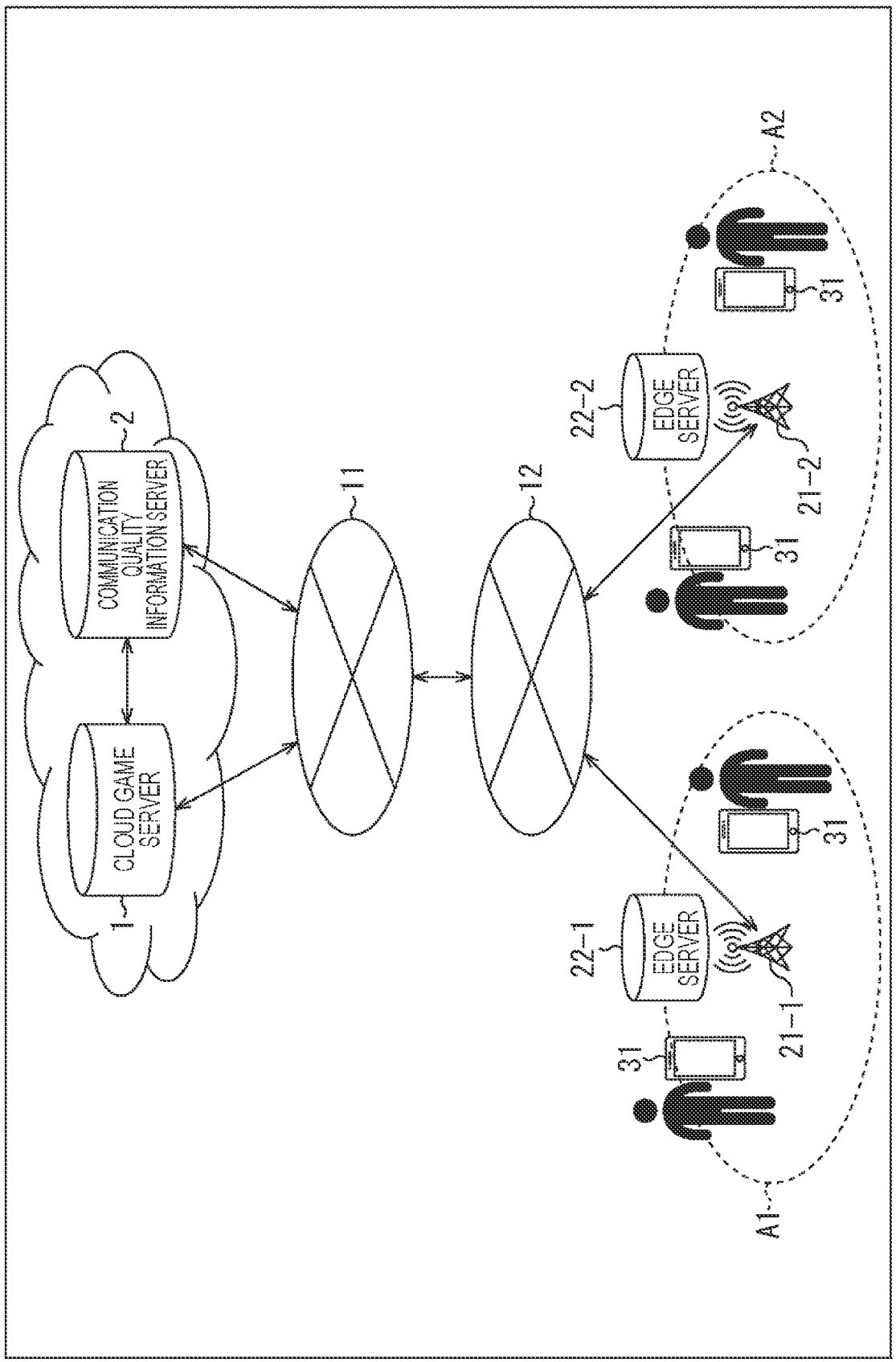
FIG. 1 is a diagram illustrating a configuration example of a cloud game system according to an embodiment of the present technology.

FIG. 1 is a diagram illustrating a configuration example of a cloud game system according to an embodiment of the present technology.

The cloud game system in FIG. 1 is an information processing system including a cloud game server 1, a communication quality information server 2, radio base stations 21-1 and 21-2, edge servers 22-1 and 22-2, and a plurality of client terminals 31. Hereinafter, in a case where it is not necessary to distinguish the radio base station 21-1 and the radio base station 21-2 from each other, they are collectively referred to as a radio base station 21. Similarly, the edge server 22-1 and the edge server 22-2 are collectively referred to as an edge server 22 in a case where it is not necessary to distinguish the edge servers.

The cloud game server 1 and the communication quality information server 2 are servers on the Internet 11. A cellular core network 12 is connected to the Internet 11, and the radio base station 21 and the edge server 22 are connected to the cellular core network 12. Communication between the cloud game server 1 and, for example, a client terminal 31 in the communication area A1 is performed via the Internet 11, the cellular core network 12, and the radio base station 21-1.

The cloud game server 1 is an information processing device having a game engine function, a rendering function, and an encoding function of a cloud game. The cloud game server 1 is managed by, for example, a service provider that provides a cloud game.

For example, the cloud game server 1 provides a cloud game to the user of the client terminal 31 by transmitting a game video obtained by rendering and displaying the game video on the client terminal 31. As described above, the cloud game is a game that proceeds by performing processing such as rendering of a game video or the like on the server side.

The communication quality information server 2 manages the communication quality of the client terminal 31 and the game experience quality which is the quality of the game experience. Information indicating the communication quality and the game experience quality is transmitted from the client terminal 31.

Furthermore, the communication quality information server 2 manages operation statuses of the radio base station 21 and the edge server 22. For example, information indicating the operation statuses of the radio base station 21 and the edge server 22 is transmitted from the radio base station 21.

In the example of FIG. 1, the cloud game server 1 and the communication quality information server 2 are illustrated as separate servers, but the function of the cloud game server 1 and the function of the communication quality information server 2 may be implemented in one server. For example, the function of the communication quality information server 2 can be provided in the cloud game server 1.

The radio base station 21 is a base station for cellular wireless communication or wireless LAN communication. For example, the radio base station 21 provides a service of 5G communication, which is communication of the fifth generation mobile communication system, to the client terminal 31 in the communication area.

FIG. 1 illustrates a communication area A1 formed as a radio wave coverage of the radio base station 21-1 and a communication area A2 formed as a radio wave coverage of the radio base station 21-2. More radio base stations 21 are connected to the cellular core network 12, and communication areas are formed by the respective radio base stations 21.

The edge server 22 is a server that has some functions for providing a cloud game and is located near the client terminal 31. The edge server 22 is installed in, for example, the radio base station 21. The edge server 22-1 is installed in the radio base station 21-1, and the edge server 22-2 is installed in the radio base station 21-2.

The cellular core network 12, the radio base station 21, and the edge server 22 constitute a network infrastructure of the mobile communication system. The devices constituting the cellular core network 12, the radio base station 21, and the edge server 22 are network devices constituting the network infrastructure.

The client terminal 31 is a portable wireless communication terminal such as a smartphone, a tablet terminal, or the like. A game application that is an application program of a cloud game is installed in the client terminal 31. The client terminal 31 may be configured by another type of device such as a TV, a PC, or the like.

The game application installed in the client terminal 31 is, for example, an application program of a game in which the user plays while moving using the position information of the client terminal 31. In conjunction with the movement of the user, the position of the user in the game space moves, and the game proceeds. The user can move his/her place in the game space by actually visiting various places with the client terminal 31 in a state in which the cloud game is activated, acquire a character or an item at each place of the movement destination, and battle against a monster.

Here, a flow of providing a cloud game in the cloud game system of FIG. 1 will be described. The cloud game is started when the client terminal 31 accesses the cloud game server 1.

For example, the cloud game server 1 renders the game video on the basis of the game logic, and distributes the game video obtained by the rendering to the client terminal 31 as a video stream via the Internet 11, the cellular core network 12, and the radio base station 21.

The client terminal 31 decodes the video stream transmitted from the cloud game server 1, and displays the game video obtained by the decoding on the display. The client terminal 31 detects various operations performed by the user who is a game player, and transmits an operation command indicating the content of the operation to the cloud game server 1.

Transmission and reception of such information are performed between the cloud game server 1 and the client terminal 31, whereby a cloud game is implemented. By using the client terminal 31 equipped with a wireless communication function such as 5G communication or the like, the user can access the cloud game server 1 via the radio base station 21 and play the cloud game even outdoors or the like.

As described above, in order to enable the user to obtain a sense of immersion in a cloud game played while moving, it is necessary to secure a high-band and stable wireless communication path and to transmit video data or the like with a large capacity and a low latency.

In the cloud game system of FIG. 1, it is possible to guide the user to a communication area where high communication quality can be secured. The guidance of the user is performed by dynamically changing the story of the cloud game on the cloud game server 1 side. The user who has moved to the communication area where high communication quality can be secured can play the cloud game with high experience quality.

<Flow of User Guidance>

Figure 2:
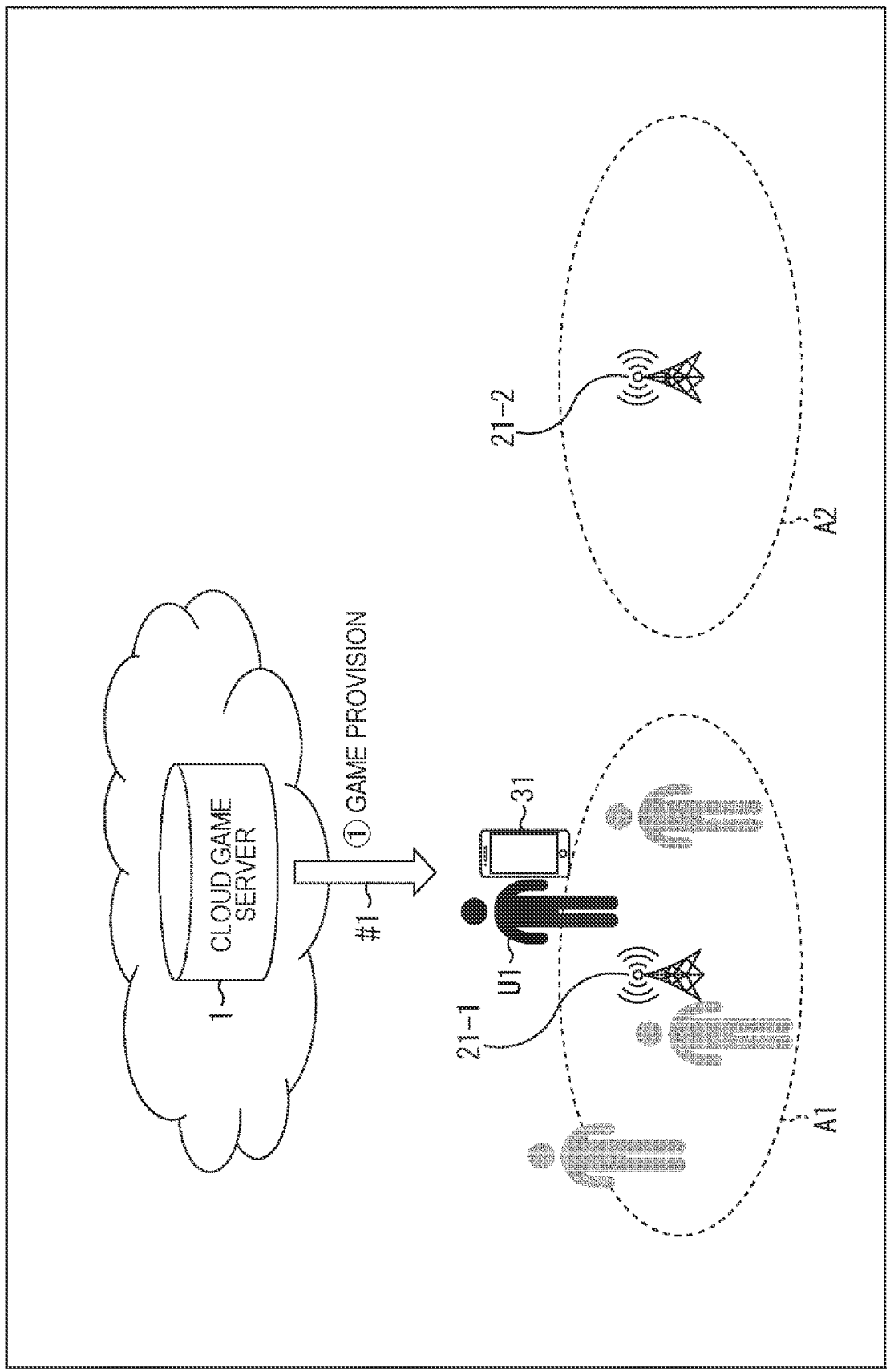
FIG. 2 is a diagram illustrating a flow of user guidance.
Figure 3:
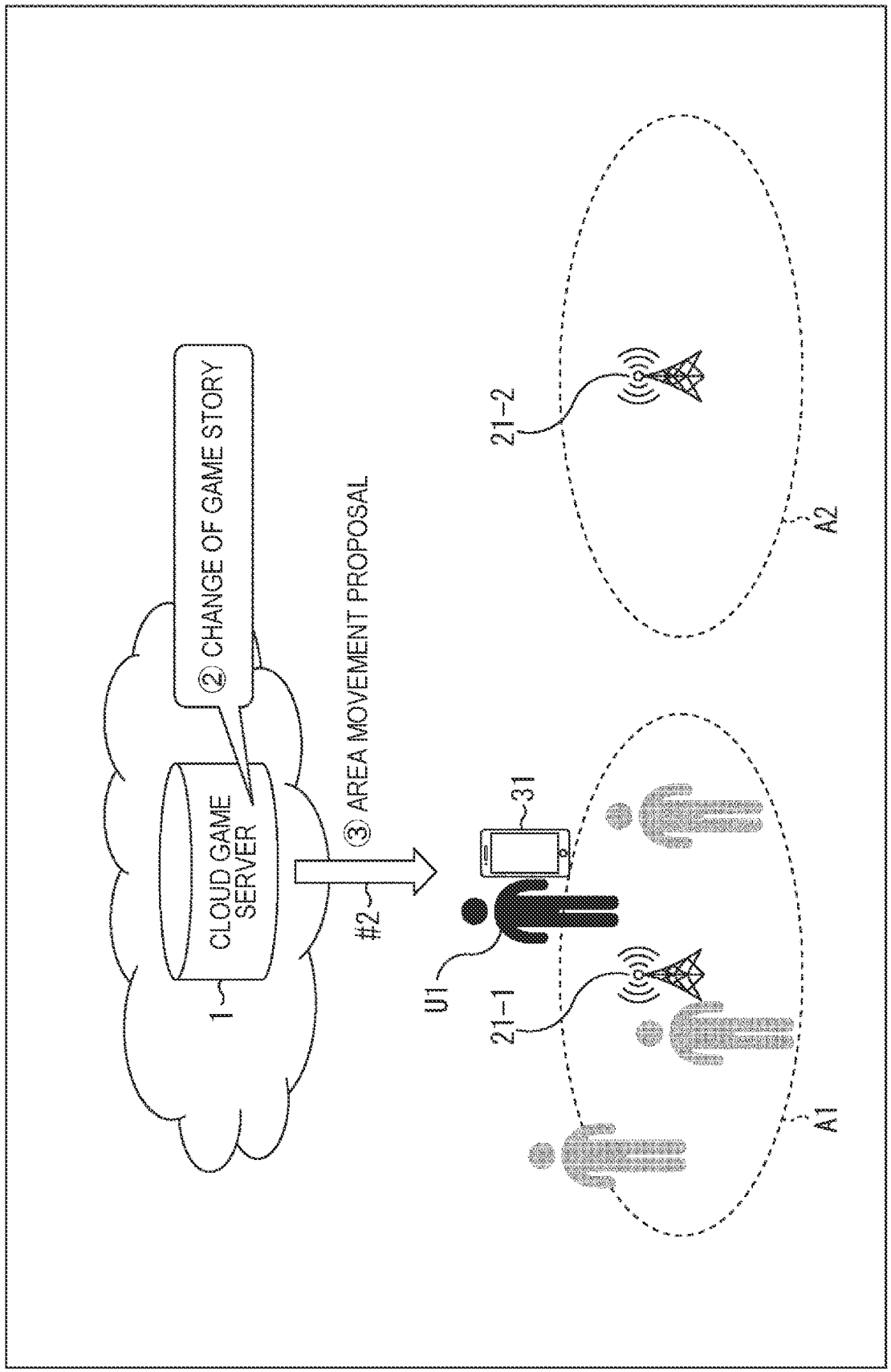
FIG. 3 is a diagram illustrating a flow of user guidance.
Figure 4:
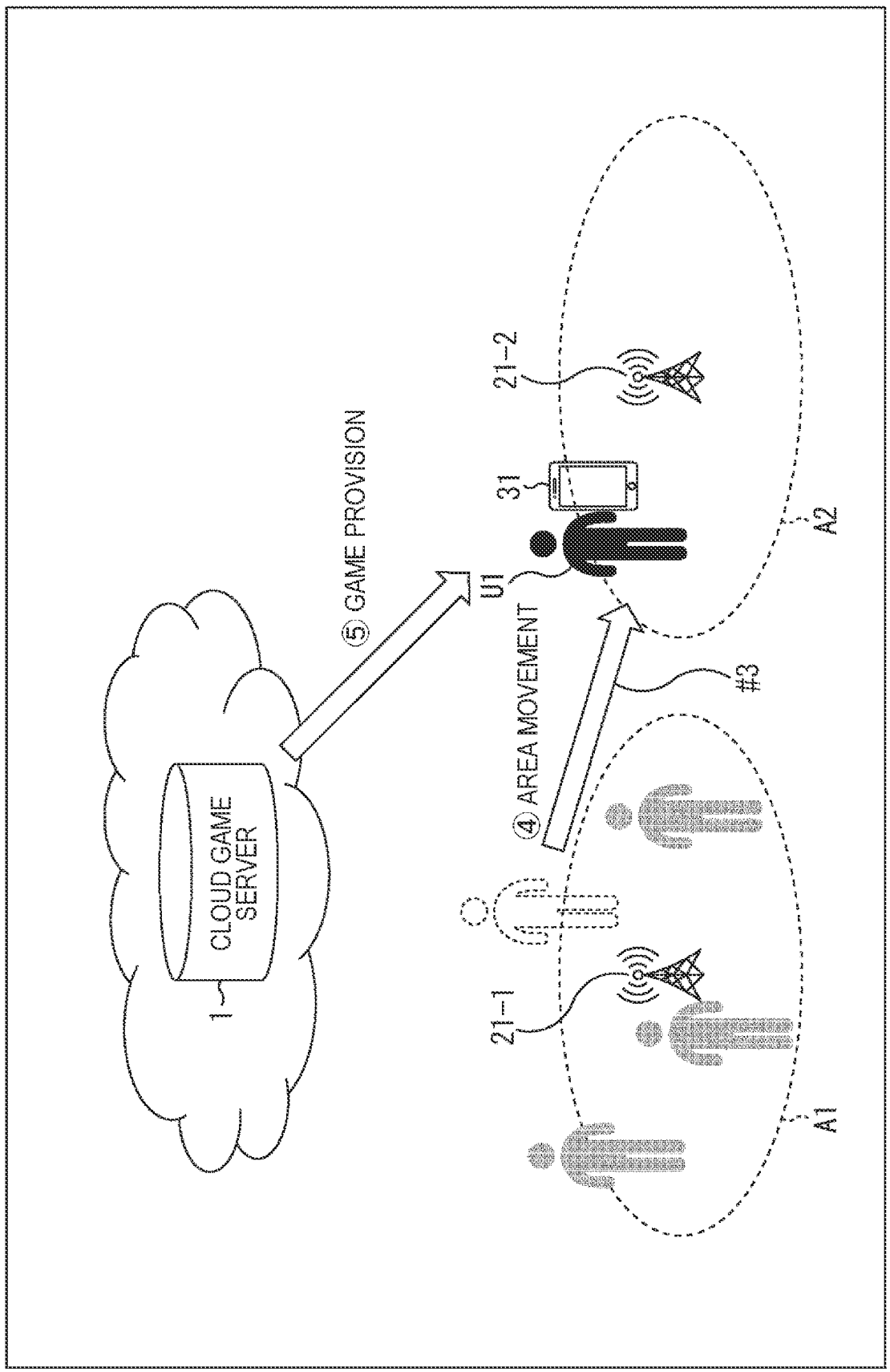
FIG. 4 is a diagram illustrating a flow of user guidance.

FIGS. 2 to 4 are diagrams illustrating a flow of user guidance.

For example, a case of guiding the user U1 illustrated in FIG. 2 will be described. It is assumed that the user U1 is playing a cloud game provided by the cloud game server 1 as indicated by an outlined arrow #1 in the communication area A1.

In the communication area A1, there are many users other than the user U1, and each user operates a client terminal 31. The communication quality of the communication area A1 is not high, and thus the experience quality of the cloud game is also not high. Since the number of accommodated terminals of the radio base station 21-2 is small, it is assumed that the communication quality of the communication area A2 adjacent to the communication area A1 is high.

As described above, in a case where the communication quality of the communication area A1 is not high, the story of the cloud game is changed in the cloud game server 1 as illustrated in a speech bubble of FIG. 3. For example, the story of the cloud game is changed to a story having a benefit for the user by actually moving to the communication area A2, and moving the place of the user in the game space from the place corresponding to the communication area A1 to the place corresponding to the communication area A2.

By presenting the contents of the story after the change in the game, a movement proposal is made as indicated by an outlined arrow #2 in FIG. 3. By moving to the communication area A2 as indicated by an outlined arrow #3 in FIG. 4 in response to the movement proposal, the user can continue the cloud game with high experience quality.

Figure 5:
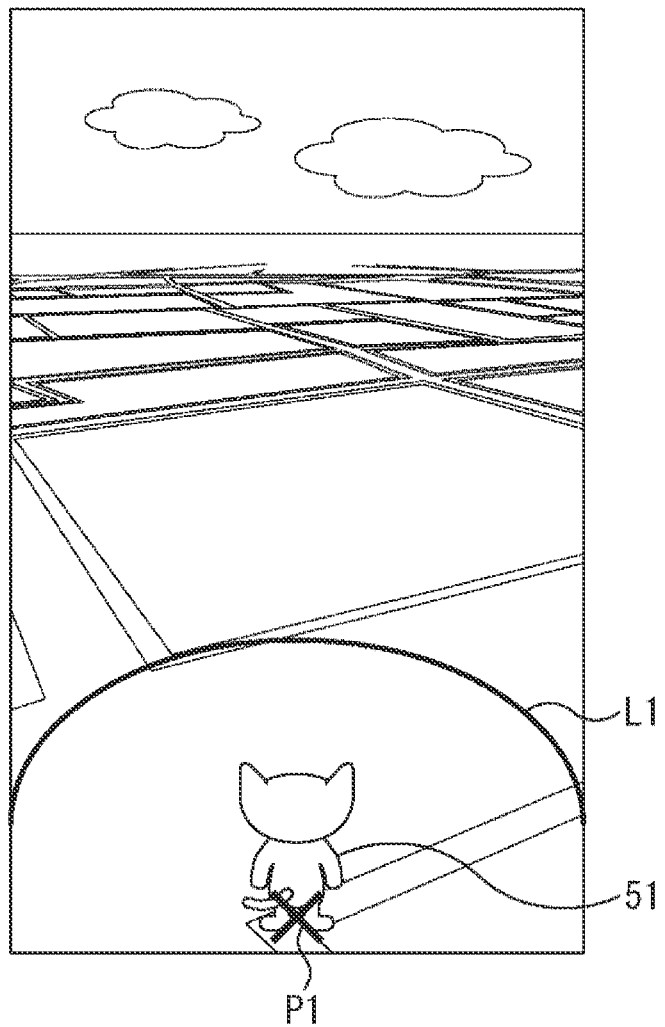
FIG. 5 is a diagram illustrating an example of screen display of a cloud game.
Figure 6:
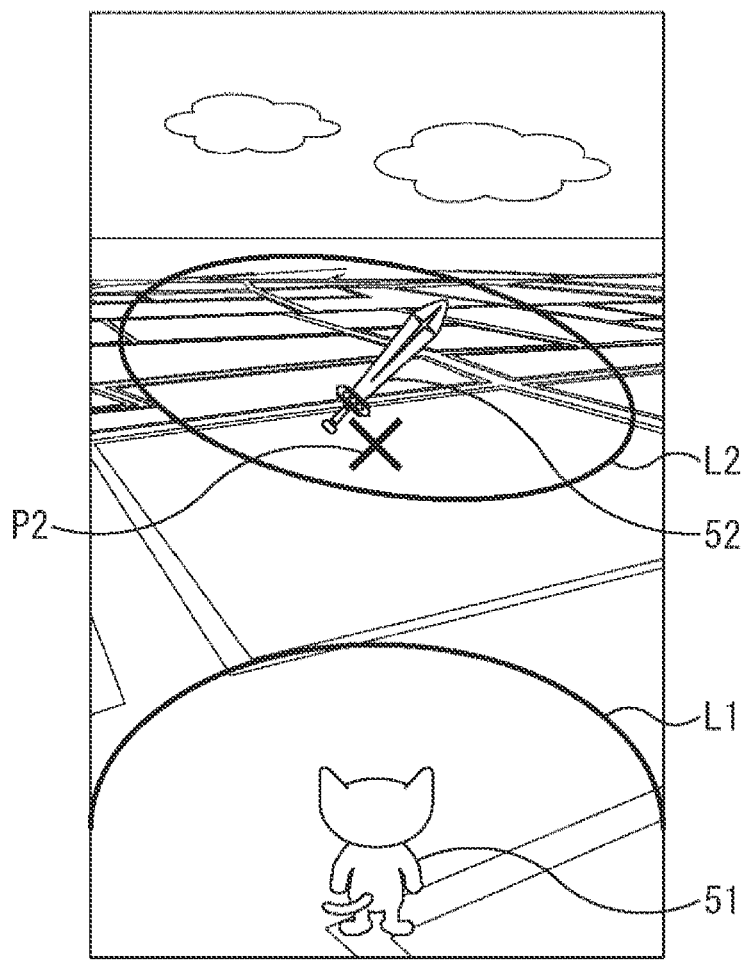
FIG. 6 is a diagram illustrating an example of screen display in which an item appears.

FIGS. 5 and 6 are diagrams illustrating examples of screen display of a cloud game.

The map displayed on the game screen of FIG. 5 represents a partial range of the game space of the cloud game. A character 51 operated by the user is displayed below the game screen.

The position P1, which is the display position of the character 51, is a position corresponding to a place in the communication area A1 where the user is actually present. As the user moves, the position of the character 51 in the game space also moves. A curve L1 on the game screen represents a range corresponding to the communication area A1.

In a case where the movement proposal for the communication area A2 is made, an item 52 serving as a bonus to the user appears on the game screen as illustrated in FIG. 6. The position P2, which is the appearance position of the item 52, is a position in the communication area A2, which is the communication area of the guidance destination. An ellipse indicated by a solid line L2 on the game screen represents a range corresponding to the communication area A2.

The item 52 is an item that is not displayed in a case where the communication quality of the communication area A1 is high. In response to the detection that the communication quality of the communication area A1 is not high, the item 52 dynamically appears at the position P2 with the change of the story.

The user accepts the movement proposal by the cloud game server 1, for example, by moving to the communication area A2 to acquire the item 52.

As described above, by changing the story of the cloud game so as to move the user to the communication area A2 having high communication quality, the cloud game server 1 can improve the game experience quality of the user in a more natural manner.

The user can also play the game with high experience quality by moving according to the movement proposal by the cloud game server 1.

<<Processing of Entire Cloud Game System>>

The entire processing of the cloud game system will be described with reference to the flowcharts of FIGS. 7 and 8.

Figure 7:
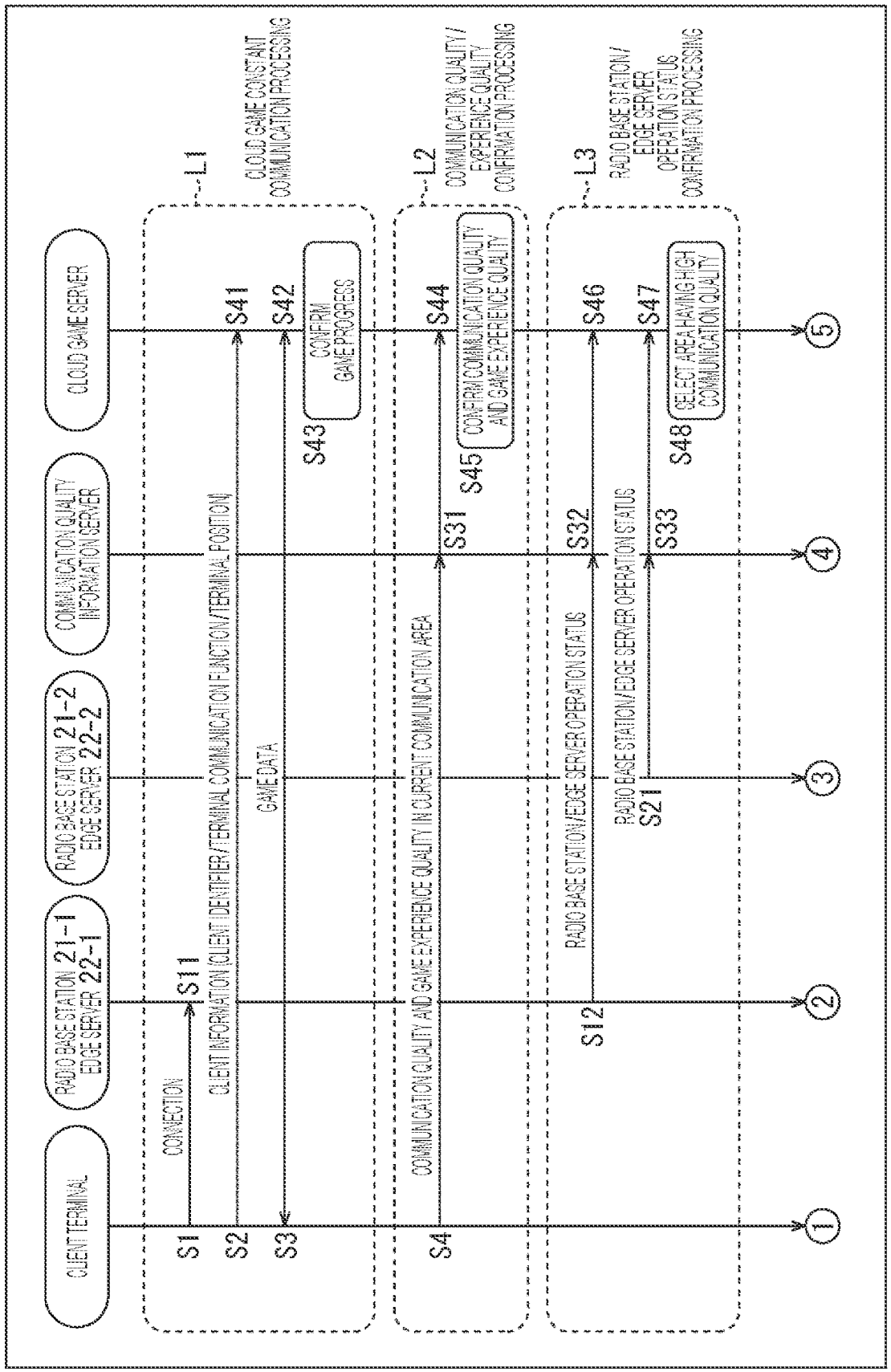
FIG. 7 is a flowchart illustrating overall processing of the cloud game system.
Figure 8:
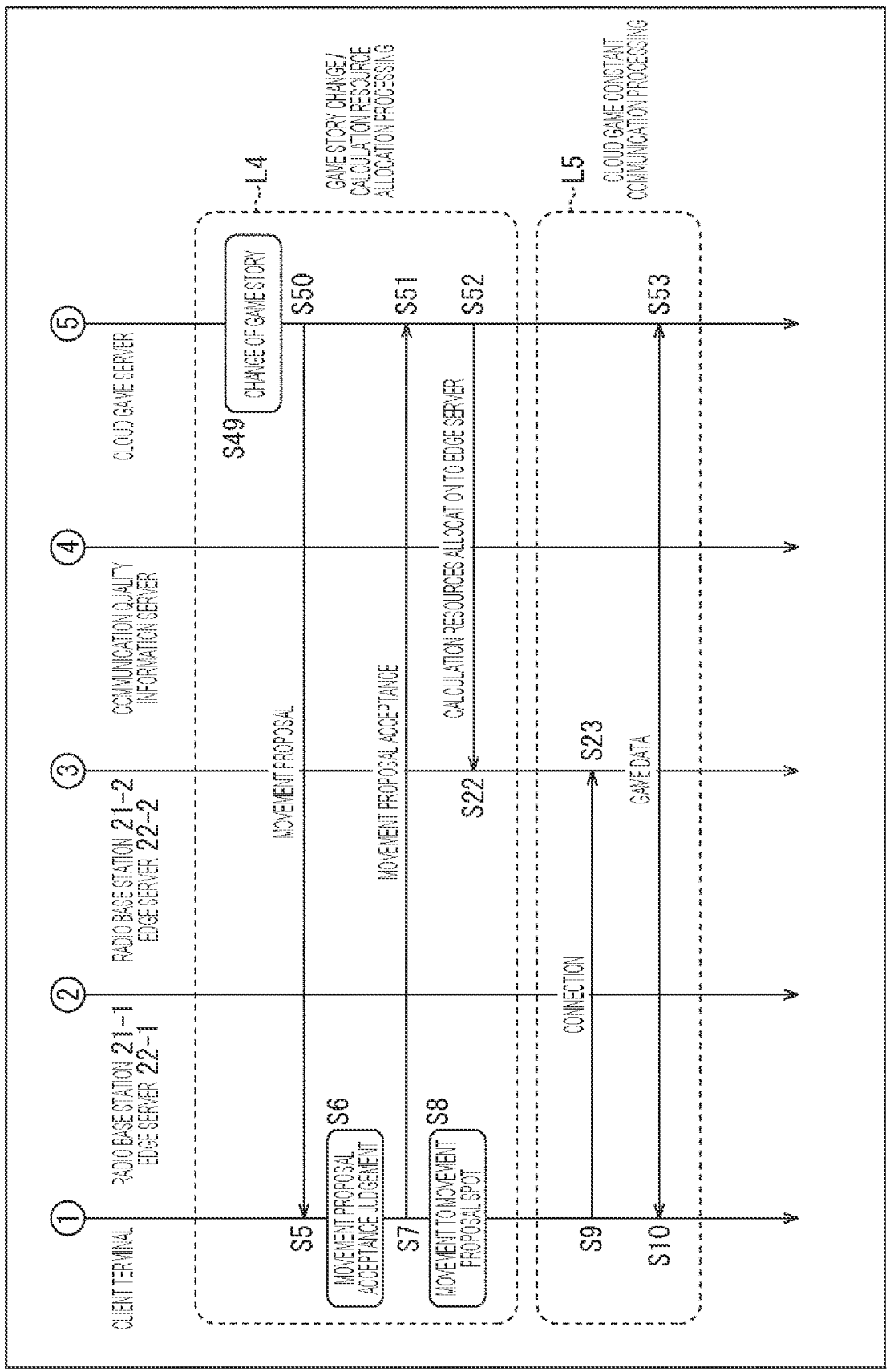
FIG. 8 is a flowchart following FIG. 7.

FIGS. 7 and 8 illustrate, as processing on the network infrastructure side, processing of the radio base station 21-1 and the edge server 22-1 that manage the communication area A1, and processing of the radio base station 21-1 and the edge server 22-1 that manage the communication area A2. The processing described as being performed by the radio base station 21-1 may be performed by the edge server 22-1. Similarly, the processing described as being performed by the radio base station 21-2 may be performed by the edge server 22-2.

As indicated by broken lines L1 to L4, the processing of the entire cloud game system includes cloud game constant communication processing, communication quality/experience quality confirmation processing, radio base station/edge server operation status confirmation processing, game story change/calculation resource allocation processing, and cloud game constant communication processing. Each processing will be described below.

<Cloud Game Constant Communication Processing>

The cloud game constant communication processing is processing performed between the client terminal 31 and the cloud game server 1 in a case where a cloud game is performed.

In step S1, the client terminal 31 activates the game application and accesses the cloud game server 1 via the radio base station 21 to which the client terminal 31 is currently connected. In the example of FIG. 5, the connection destination of the client terminal 31 is the radio base station 21-1.

In step S11, the radio base station 21-1 accepts connection by the client terminal 31 and controls communication between the client terminal 31 and the cloud game server 1.

In step S2, the client terminal 31 transmits the client information to the cloud game server 1.

Figure 9:
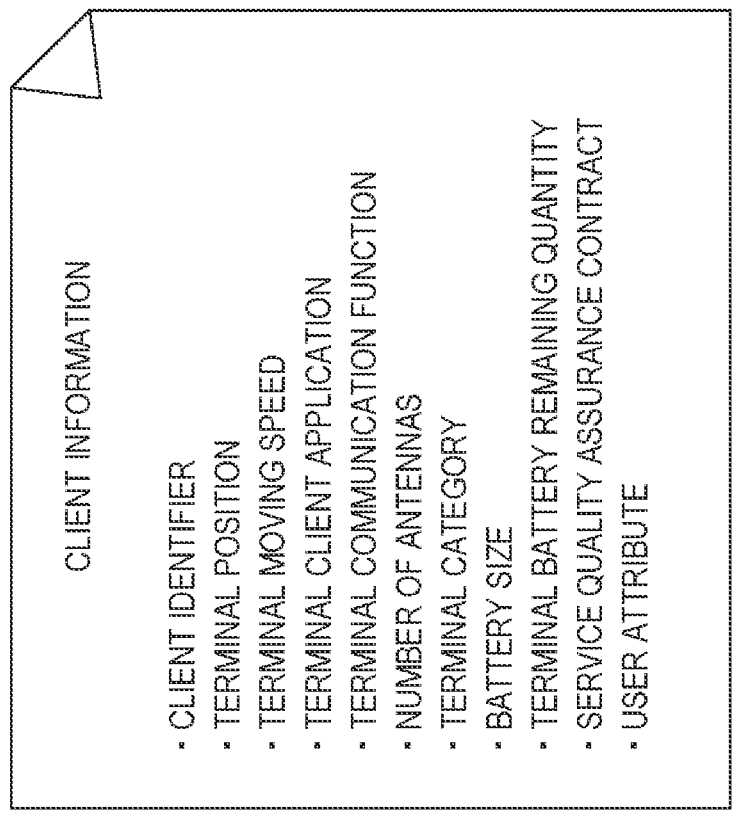
FIG. 9 is a diagram illustrating an example of client information.

FIG. 9 is a diagram illustrating an example of client information.

As illustrated in FIG. 9, the parameters of the client information include the following information.

Client identifier
Terminal position
Terminal moving speed
Terminal client application
Terminal communication function
Number of antennas
Terminal category
Battery size
Terminal battery remaining quantity
Service quality assurance contract
User attribute Describing main information, for example, the client identifier is identification information of the client terminal 31. On the basis of the client identifier, the contract status of the user related to the cloud game is uniquely identified on the cloud game server 1 side.

The terminal client application is information indicating a game application being executed in the client terminal 31.

The terminal communication function is information indicating a wireless communication function (4G/5G/Wi-Fi) or a compatible frequency band supported by the client terminal 31.

The terminal category is information indicating a category of the client terminal 31 such as a smartphone, a tablet terminal, an automobile, or the like.

The service quality assurance contract is information indicating quality that the service provider guarantees to the user who is a contractor.

The user attribute includes information indicating age, sex, residential place, and the like.

In step S41 of FIG. 7, the cloud game server 1 receives the client information transmitted from the client terminal 31. After the game application or the like being executed in the client terminal 31 is specified on the basis of the client information, transmission and reception of game data, which is data related to the cloud game, is performed between the cloud game server 1 and the client terminal 31.

That is, in step S42, the cloud game server 1 transmits the video stream of the game video to the client terminal 31, and receives the operation command transmitted from the client terminal 31. The cloud game server 1 manages the progress of the cloud game according to the user's operation or the like.

Meanwhile, in step S3, the client terminal 31 receives the video stream transmitted from the cloud game server 1, displays the game video on the display, and transmits an operation command indicating the content of the user's operation to the cloud game server 1.

In step S43, the cloud game server 1 confirms the game progress of the user. The above processing is repeatedly performed in each of the cloud game server 1 and the client terminal 31.

<Communication Quality/Experience Quality Confirmation Processing>

The communication quality/experience quality confirmation processing is processing of confirming the quality of wireless communication and the game experience quality on the client terminal 31 side on the server side.

In step S4, the client terminal 31 acquires the communication quality in the current communication area and acquires the game experience quality that is the quality of the game experience that changes depending on the communication quality. The client terminal 31 transmits communication quality information indicating the communication quality and the game experience quality to the communication quality information server 2.

In step S31, the communication quality information server 2 receives the communication quality information transmitted from the client terminal 31 and transmits the communication quality information to the cloud game server 1.

In step S44, the cloud game server 1 receives the communication quality information transmitted from the client terminal 31 via the communication quality information server 2.

In step S45, the cloud game server 1 confirms the communication quality and the game experience quality of the client terminal 31 on the basis of the communication quality information.

Communication quality information indicating the communication quality of the wireless communication of the client terminal 31 and the game experience quality that changes depending on the communication quality is periodically transmitted from the client terminal 31. In the cloud game server 1, the communication quality and the game experience quality of the client terminal 31 are stored and monitored.

Figure 10:
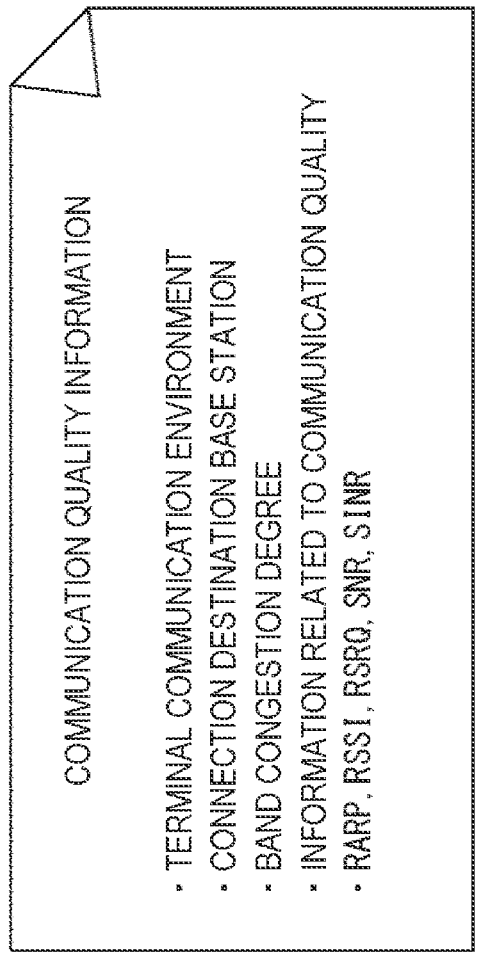
FIG. 10 is a diagram illustrating an example of communication quality information.

FIG. 10 is a diagram illustrating an example of the communication quality information.

As illustrated in FIG. 10, the parameters of the communication quality information include the following information.

Terminal communication environment
Connection destination base station
Band congestion degree
Information related to communication quality
RARP, RSSI, RSRQ, SNR, SINR, and the like Information indicating the game experience quality is included in the communication quality information as information related to the communication quality. The game experience quality is expressed, for example, in a numerical form according to the communication quality.

<Radio Base Station/Edge Server Operation Status Confirmation Processing>

The radio base station/edge server operation status confirmation processing is processing of confirming the operation status of each of the radio base station 21 and the edge server 22 on the server side. The communication quality of each communication area is represented by the operation status of the radio base station 21 and the edge server 22.

In step S12, the radio base station 21-1 managing the communication area A1 acquires its own operation status and acquires the operation status of the edge server 22-1. The radio base station 21-1 transmits operation status information indicating the operation status of the radio base station 21-1 and the operation status of the edge server 22-1 to the communication quality information server 2.

In step S32, the communication quality information server 2 receives the operation status information transmitted from the radio base station 21-1 and transmits the operation status information to the cloud game server 1.

In step S46, the cloud game server 1 receives the operation status information transmitted from the radio base station 21-1 via the communication quality information server 2, and confirms the operation status of the radio base station 21-1 and the operation status of the edge server 22-1.

Similar processing is performed in the radio base station 21-2 that manages the communication area A2. That is, in step S31, the radio base station 21-2 acquires its own operation status and acquires the operation status of the edge server 22-2. The radio base station 21-2 transmits operation status information indicating the operation status of the radio base station 21-2 and the operation status of the edge server 22-2 to the communication quality information server 2.

In step S33, the communication quality information server 2 receives the operation status information transmitted from the radio base station 21-2 and transmits the operation status information to the cloud game server 1.

In step S47, the cloud game server 1 receives the operation status information transmitted from the radio base station 21-2 via the communication quality information server 2, and confirms the operation status of the radio base station 21-2 and the operation status of the edge server 22-2.

In the cloud game server 1, the operation status of the radio base station 21 and the operation status of the edge server 22 are stored and monitored on the basis of the operation status information periodically transmitted from the radio base station 21 managing each communication area.

In step S48, the cloud game server 1 selects a communication area having high communication quality and sufficient calculation resources of the edge server 22 from among the communication areas formed around the communication area where the user of the client terminal 31 is located on the basis of the operation statuses of the radio base station 21 and the edge server 22. For example, in order to improve the game experience quality of the user of the client terminal 31, which radio base station 21 and edge server 22 should be used, that is, which communication area the user should move to is specified.

Figure 11:
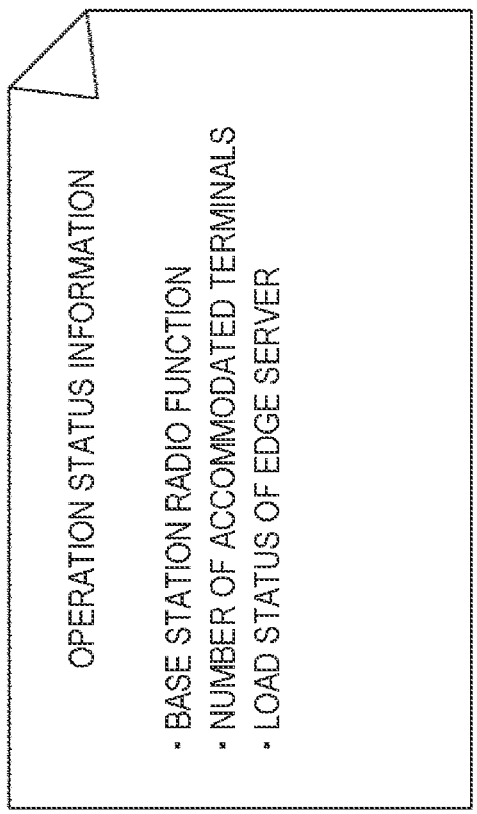
FIG. 11 is a diagram illustrating an example of operation status information.

FIG. 11 is a diagram illustrating an example of the operation status information.

As illustrated in FIG. 11, the parameters of the operation status information include the following information.

Base station radio function
Number of accommodated terminals
Load status of edge server The base station radio function is information indicating a specification of the radio base station 21, such as a supported frequency, the number of antennas, and the like.

The number of accommodated terminals represents the number of client terminals 31 currently accommodated (client terminals 31 existing in the communication area).

The load status of the edge server represents the level of the load of the edge server 22.

<Game Story Change/Calculation Resource Allocation Processing>

The game story change/calculation resource allocation processing of FIG. 8 is processing of suggesting the user to move the communication area by changing the game story. Furthermore, the game story change/calculation resource allocation processing is processing of allocating calculation resources to the edge server 22 of the communication area of the movement destination in a case where the user moves to a new communication area.

In step S49, the cloud game server 1 changes the game story. The change of the game story is performed, for example, in a case where it is detected that the game experience quality of the client terminal 31 is deteriorated due to the interference from other devices or the deterioration of the communication quality due to the density of the users. The deterioration of the game experience quality may be detected on the basis of the communication quality information transmitted from the client terminal 31, or may be detected on the basis of the operation status information transmitted from the radio base station 21.

The change of the game story is performed such that the story before the change is changed to a story having a benefit for the user by moving to the movement proposal spot. The movement proposal spot is the communication area selected in step S48 as a communication area having high communication quality and sufficient calculation resources of the edge server 22.

As a method of changing a game story, there is a method of changing a different game story prepared for each user in real time. Furthermore, there is a method of selecting a story that is most likely to be effective from among a plurality of game stories prepared in advance according to statuses of communication quality and game experience quality of wireless communication.

In step S50, the cloud game server 1 transmits information on the movement proposal spot to the client terminal, and causes the client terminal 31 to present movement guidance to the movement proposal spot.

In step S5, the client terminal 31 displays movement guidance to the movement proposal spot on the screen of the cloud game on the basis of the information transmitted from the cloud game server 1.

The presentation of the movement guidance is performed such that information corresponding to the story after the change is displayed on the screen of the cloud game. As described with reference to FIGS. 5, 6, and the like, for example, in the game using the position information of the user, the virtual event is generated according to the story after the change, and the information of the event is superimposed and displayed on the map of the game space, thereby prompting the user to move to the movement proposal spot.

As described above, the movement is indirectly prompted by associating the movement proposal spot with the event and guiding to the movement proposal spot. As the type of the event, it is possible to use various events that give the user an impression that the user wants to move to the movement proposal spot, such as the appearance of a character, the addition of points of a game, the appearance of a recovery area of a physical power of a character, and the like.

On the other hand, information indicating that the communication quality or the like of the current communication area is deteriorating may be displayed on the game screen, and movement guidance may be presented so as to prompt the user to leave the place. For example, in the map of the game space, an area having low communication quality due to dense users is displayed in red, and an area having high communication quality is displayed in green, thereby presenting movement guidance.

In step S6, the client terminal 31 determines whether or not the user accepts the proposal for movement to the movement proposal spot. Whether or not the user accepts the movement proposal is determined by what kind of selection the user has made for the display according to the game story.

In a case where a button used to select "Yes/No" is displayed on the game screen together with a message such as "MOVE TO MOVEMENT PROPOSAL SPOT?" or the like, it is determined whether or not the user accepts the movement proposal according to the button selected by the user. As a method of determining that the user accepts the movement proposal, there is also a method of detecting that the user starts to move in the direction of the movement proposal spot or the like.

In a case where the user accepts the movement proposal, in step S7, the client terminal 31 transmits information indicating that the movement proposal is accepted to the cloud game server 1.

In step S8, as the user moves to the movement proposal spot, the client terminal 31 switches the radio base station 21 to be the connection destination from, for example, the radio base station 21-1 to the radio base station 21-2. In this example, the movement proposal spot is the communication area A2 managed by the radio base station 21-2.

In step S51, the cloud game server 1 receives the information indicating that the user has accepted the movement proposal transmitted from the client terminal 31.

In step S52, the cloud game server 1 performs control for allocating calculation resources to the edge server 22-2 that manages the communication area A2 as the movement proposal spot.

In step S22, the edge server 22-2 secures calculation resources for the user of the client terminal 31 moving to the communication area A2 under the control of the cloud game server 1.

<Cloud Game Constant Communication Processing>

After the movement to the movement proposal spot, cloud game constant communication processing is performed between the client terminal 31 and the cloud game server 1.

That is, in step S9, the client terminal 31 is connected to the radio base station 21-2 that manages the communication area A2 that is the communication area of the movement destination, and communicates with the cloud game server 1 via the radio base station 21-2.

In step S23, the radio base station 21-2 accepts connection by the client terminal 31.

In step S53, the cloud game server 1 transmits the video stream of the game video to the client terminal 31, and receives the operation command transmitted from the client terminal 31. The cloud game server 1 manages the progress of the cloud game according to the user's operation or the like.

Meanwhile, in step S10, the client terminal 31 receives the video stream transmitted from the cloud game server 1, displays the game video on the display, and transmits an operation command indicating the content of the user's operation to the cloud game server 1.

As described above, by changing the story of the cloud game so that the user moves to the communication area A2 having high communication quality, the cloud game server 1 can improve the game experience quality of the user in a more natural manner.

Since the user spontaneously moves in order to improve the game experience quality, the cloud game server 1 can easily guide the user to the communication area where high communication quality can be secured.

It is assumed that the game story is changed in a case where the game experience quality is deteriorated. However, even in a case where the game experience quality is not deteriorated, it may be proposed to the user to pass through the periphery of the communication area where the communication quality of the wireless communication is high. The calculation resources may be allocated in advance to the edge server 22 at a position close to the position where the user moves next.

In a case where the user desires a game experience with reduced communication costs instead of the communication quality of wireless communication, movement to a communication area managed by a radio base station 21 with a low bit rate may be proposed. The user's desire for a game experience with reduced communication costs is specified, for example, on the basis of the service quality assurance contract.

<<Processing of Each Node>>

Next, operations of the client terminal 31, the radio base station 21/edge server 22 (network infrastructure), and the cloud game server 1 will be described.

<Processing of Client Terminal 31>

Figure 12:
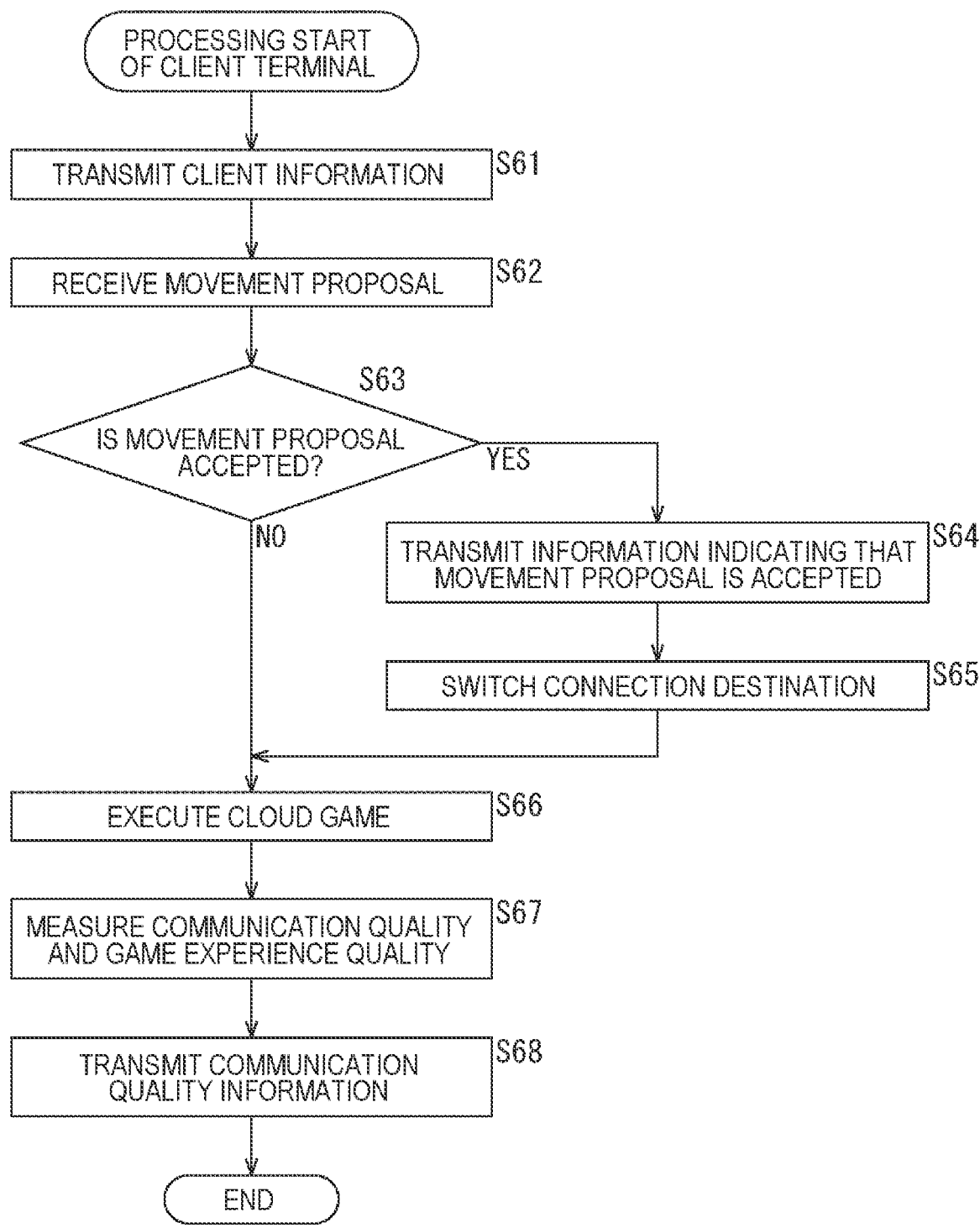
FIG. 12 is a flowchart illustrating processing of a client terminal.

The processing of the client terminal 31 will be described with reference to the flowchart of FIG. 12.

In step S61, the client terminal 31 transmits the client information to the cloud game server 1.

In step S62, the client terminal 31 receives the movement proposal transmitted from the cloud game server 1. For example, using the display of the game screen, the user is suggested to move to the movement proposal spot as described above.

In step S63, the client terminal 31 judges whether or not the user accepts the movement proposal.

In a case where it is judged in step S63 that the movement proposal is accepted, in step S64, the client terminal 31 transmits information indicating that the movement proposal is accepted to the cloud game server 1.

In step S65, the client terminal 31 switches the radio base station 21 to be the connection destination to the radio base station 21 in the communication area of the movement destination. Communication with the cloud game server 1 is performed via the radio base station 21 in the communication area of the movement destination.

In a case where the connection destination is switched or in a case where it is judged in step S63 that the movement proposal is not accepted, in step S66, the client terminal 31 performs the cloud game constant communication processing and executes the cloud game.

In step S67, the client terminal 31 measures the communication quality and the game experience quality.

In step S68, the client terminal 31 transmits the communication quality information indicating the measurement result to the cloud game server 1.

<Processing of Radio Base Station 21/Edge Server 22>

Figure 13:
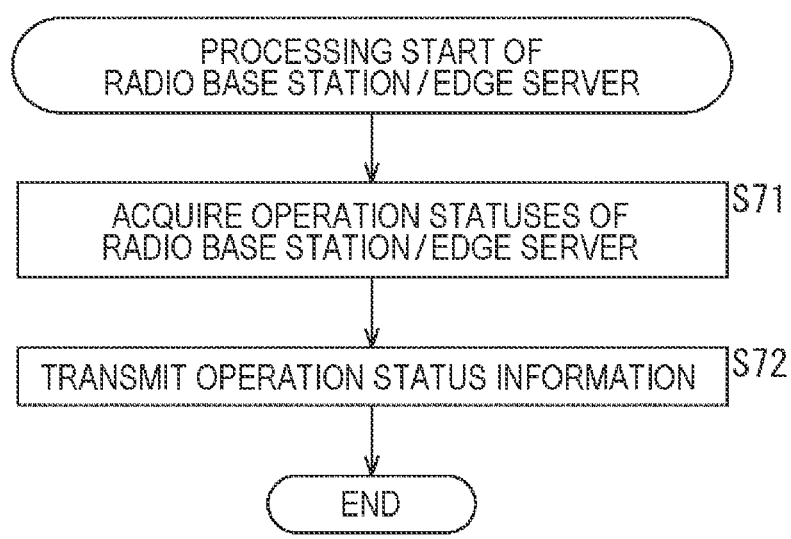
FIG. 13 is a flowchart illustrating processing of a radio base station and an edge server.

Processing of the radio base station 21 and the edge server 22 which are network devices constituting the network infrastructure will be described with reference to the flowchart of FIG. 13. Here, it is assumed that the radio base station 21 performs each processing, but the processing illustrated in FIG. 13 is appropriately performed by the edge server 22.

In step S71, the radio base station 21 acquires its own operation status and acquires the operation status of the edge server 22.

In step S72, the radio base station 21 transmits operation status information indicating the acquired operation status to the cloud game server 1. The above processing is performed by the radio base station 21 that manages each communication area.

<Processing of Cloud Game Server 1>

Figure 14:
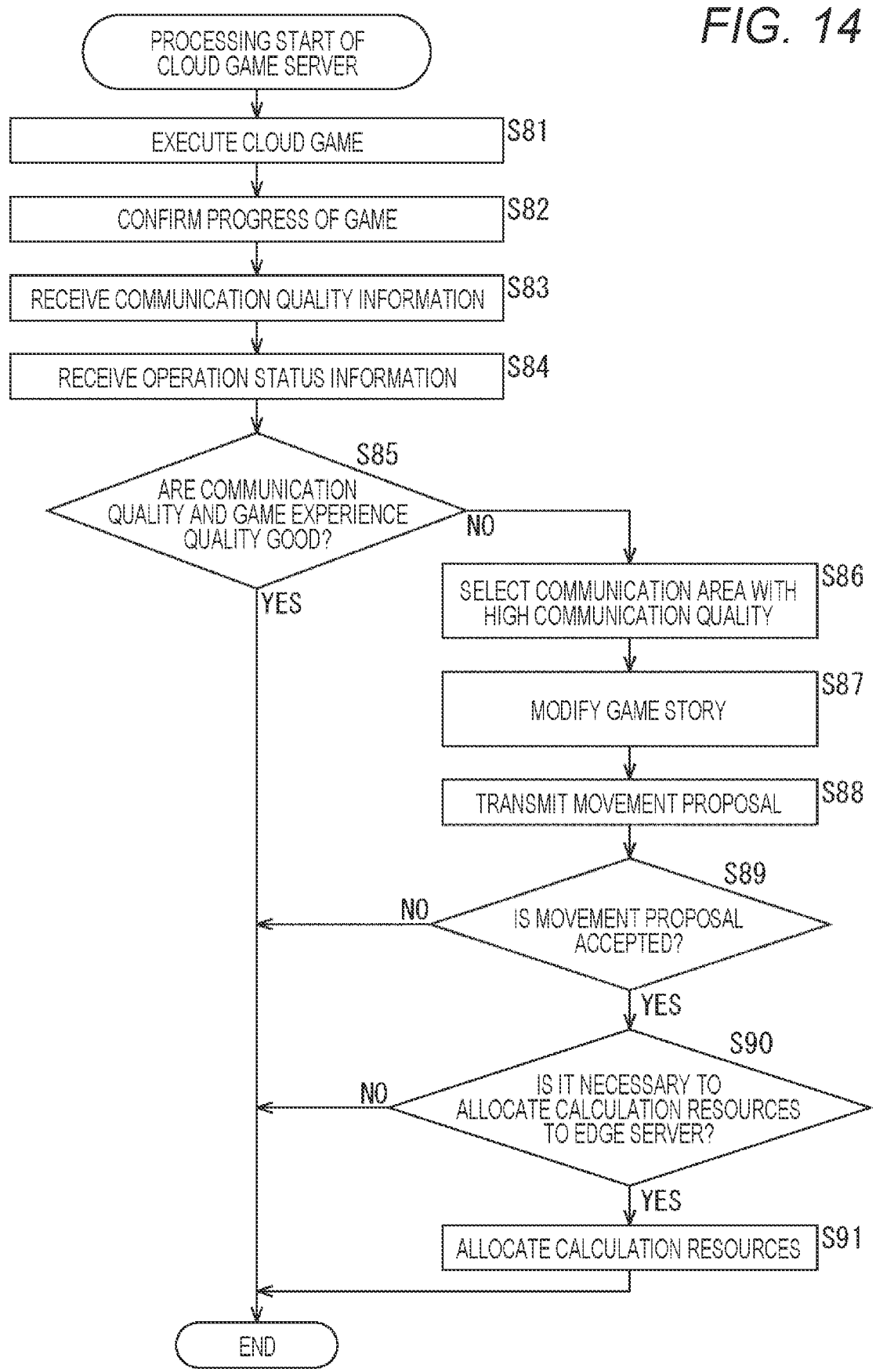
FIG. 14 is a flowchart illustrating processing of a cloud game server.

The processing of the cloud game server 1 will be described with reference to the flowchart of FIG. 14.

In step S81, the cloud game server 1 executes a cloud game. That is, the cloud game constant communication processing is performed with the client terminal 31, and the cloud game is provided to the client terminal 31.

In step S82, the cloud game server 1 confirms the progress of the game.

In step S83, the cloud game server 1 receives the communication quality information transmitted from the client terminal 31.

In step S84, the cloud game server 1 receives the operation status information transmitted from the radio base station 21 that manages each communication area. The operation status of the radio base station 21 and the like in each communication area is confirmed on the basis of the operation status information.

In step S85, the cloud game server 1 judges whether or not the communication quality and the game experience quality in the client terminal 31 are good.

In a case where it is judged in step S85 that the communication quality and the game experience quality are poor, in step S86, the cloud game server 1 selects a communication area with high communication quality to be the movement proposal spot.

In step S87, the cloud game server 1 changes the story of the cloud game so as to change the story to a story having a benefit for the user by moving to the movement proposal spot.

In step S88, the cloud game server 1 transmits the information on the movement proposal spot to the client terminal 31.

In step S89, the cloud game server 1 judges whether or not the movement proposal is accepted.

In a case where it is judged in step S89 that the movement proposal is accepted, in step S90, the cloud game server 1 judges whether or not it is necessary to allocate calculation resources to the edge server 22.

In a case where it is judged in step S90 that the allocation of the calculation resources is necessary, in step S91, the cloud game server 1 allocates the calculation resources to the edge server 22 of the communication area that is the movement destination of the user of the client terminal 31. After the allocation of the calculation resources is performed, the process ends.

In a case where it is judged in step S85 that the communication quality and the game experience quality are good, change of the game story or the like is not performed, and the process ends. In a case where it is judged in step S89 that the movement proposal is not accepted, and in a case where it is judged in step S90 that allocation of the calculation resources to the edge server 22 is unnecessary, the process similarly ends.

<<Configuration of Each Device>>

Here, configurations of the cloud game server 1, the communication quality information server 2, and the client terminal 31 that implement the above processing will be described.

<Configuration of Client Terminal 31>

Figure 15:
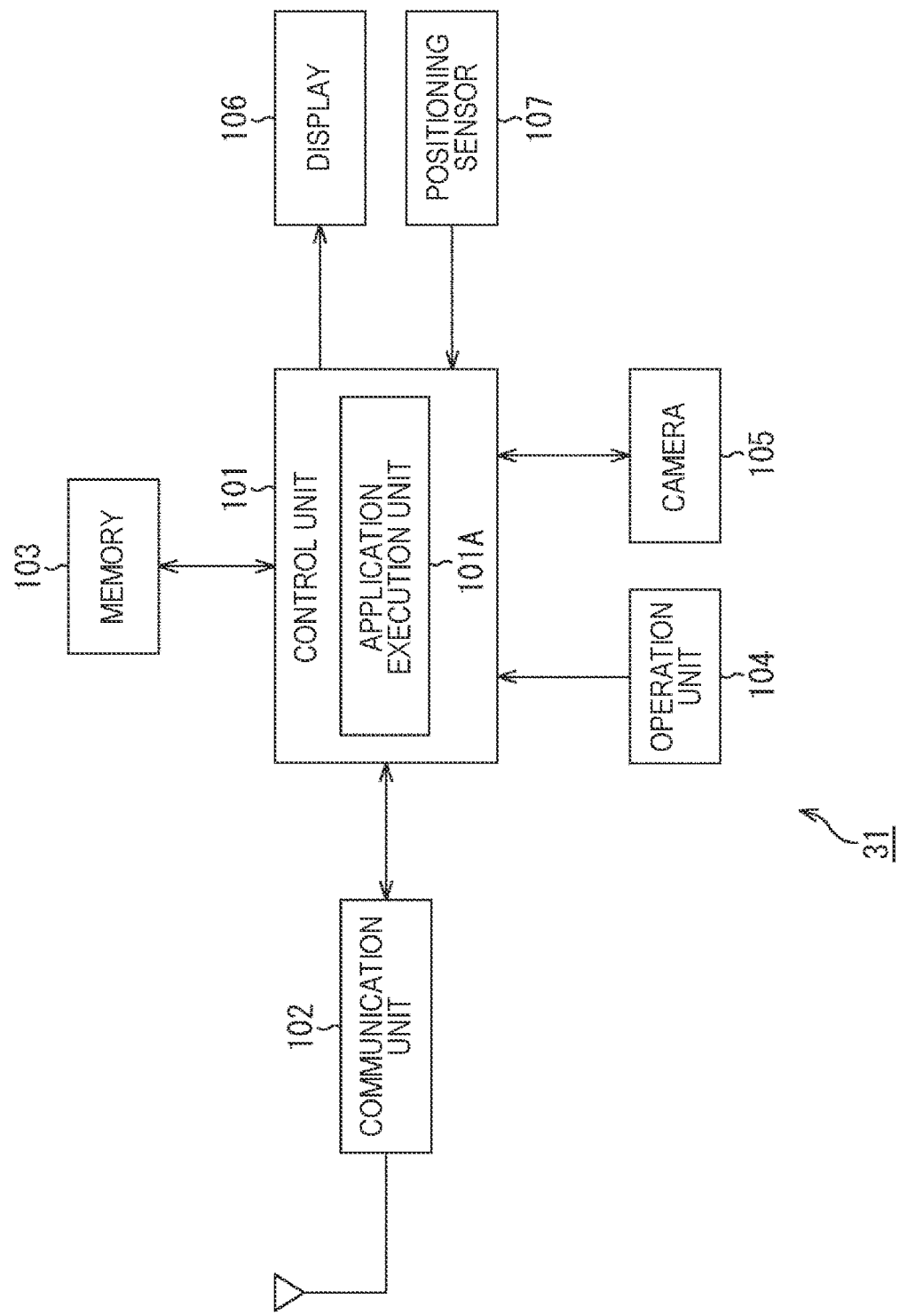
FIG. 15 is a block diagram illustrating a configuration example of a client terminal.

FIG. 15 is a block diagram illustrating a configuration example of the client terminal 31.

As illustrated in FIG. 15, the client terminal 31 is configured by connecting a communication unit 102, a memory 103, an operation unit 104, a camera 105, a display 106, and a positioning sensor 107 to the control unit 101.

The control unit 101 includes a CPU, a ROM, a RAM, and the like. The control unit 101 controls the entire operation of the client terminal 31 by executing a predetermined program.

In the control unit 101, an application execution unit 101A is implemented. Various applications such as a game application of a cloud game or the like are executed by the application execution unit 101A.

The communication unit 102 is a communication module corresponding to wireless communication of a mobile communication system such as 5G communication or the like. The communication unit 102 receives radio waves output from the radio base station 21 and communicates with various devices such as the cloud game server 1 or the like via the radio base station 21 and the like. The communication unit 102 receives information transmitted from the cloud game server 1 and outputs the information to the control unit 101. Furthermore, the communication unit 102 transmits the information supplied from the control unit 101 to the cloud game server 1.

The memory 103 includes a flash memory or the like. The memory 103 stores various types of information such as an application executed by the control unit 101 or the like.

The operation unit 104 includes various buttons and a touch panel provided to overlap the display 106. The operation unit 104 outputs information indicating the content of the user's operation to the control unit 101.

The camera 105 captures an image according to an operation by a user.

The display 106 includes an organic EL display, an LCD, and the like. Various screens such as a screen of a cloud game or the like are displayed on the display 106.

The positioning sensor 107 includes a positioning sensor such as a GPS sensor and the like. The positioning sensor 107 outputs information indicating a positioning result of the position of the client terminal 31 to the control unit 101.

Figure 16:
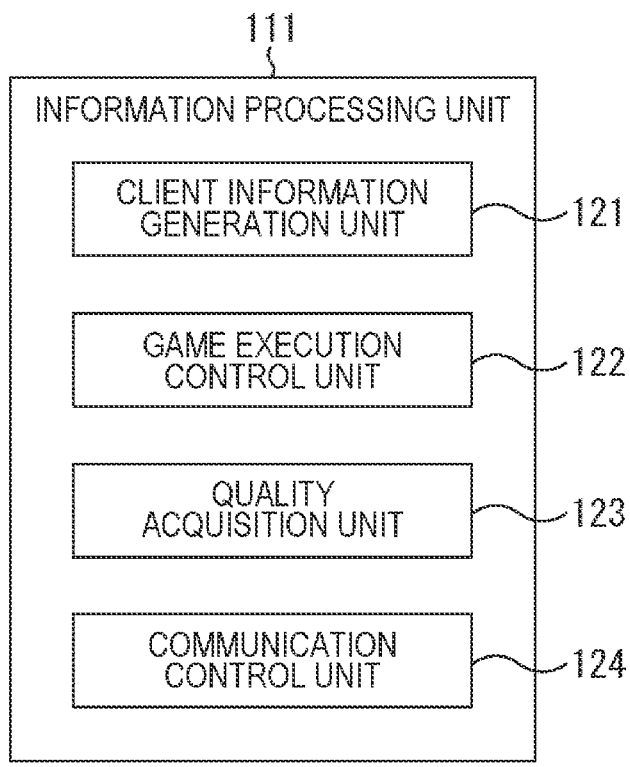
FIG. 16 is a block diagram illustrating a functional configuration example of a client terminal.

FIG. 16 is a block diagram illustrating a functional configuration example of the client terminal 31.

In the client terminal 31, an information processing unit 111 is implemented. The information processing unit 111 includes a client information generation unit 121, a game execution control unit 122, a quality acquisition unit 123, and a communication control unit 124. At least a part of the functional units illustrated in FIG. 16 is implemented by execution of a game application by the application execution unit 101A in FIG. 15.

The client information generation unit 121 generates client information including information such as a terminal position measured by the positioning sensor 107 and the like. The client information generated by the client information generation unit 121 is output to the communication control unit 124. The generation of the client information in step S2 of FIG. 7 is processing performed by the client information generation unit 121.

The game execution control unit 122 controls the progress of the cloud game. That is, the game execution control unit 122 acquires the game video transmitted from the cloud game server 1 and displays the screen of the cloud game on the display 106. Presentation of movement guidance to the movement proposal spot based on the information received in step S5 of FIG. 8, determination processing in step S6, and the like are processing performed by the game execution control unit 122.

Furthermore, the game execution control unit 122 detects various operations performed by the user and generates an operation command indicating the content of the operation. The operation command generated by the game execution control unit 122 is output to the communication control unit 124.

The quality acquisition unit 123 acquires the communication quality in the current communication area by performing environment recognition on the client terminal 31 side. Furthermore, the quality acquisition unit 123 acquires the game experience quality and generates communication quality information indicating the communication quality and the game experience quality. The quality acquisition unit 123 outputs the communication quality information to the communication control unit 124 and causes the communication control unit 124 to transmit the communication quality information to the cloud game server 1. The generation of the communication quality information in step S4 of FIG. 7 is processing performed by the quality acquisition unit 123.

The communication control unit 124 controls the communication unit 102 to communicate with the cloud game server 1 and transmits and receives various types of information. For example, the communication control unit 124 receives the game video transmitted from the cloud game server 1 and outputs the game video to the game execution control unit 122. Furthermore, the communication control unit 124 transmits the operation command generated by the game execution control unit 122 to the cloud game server 1.

The communication control unit 124 transmits the client information generated by the client information generation unit 121 and the communication quality information generated by the quality acquisition unit 123 to the cloud game server 1. The transmission of the client information in step S2 of FIG. 7 and the transmission of the communication quality information in step S4 are processing performed by the communication control unit 124.

Furthermore, the communication control unit 124 receives the game data and the movement proposal transmitted from the cloud game server 1. The processing in step S3 in FIG. 7, the processing in step S5 in FIG. 8, and the like are processing performed by the communication control unit 124.

<Configuration of Cloud Game Server 1>

Figure 17:
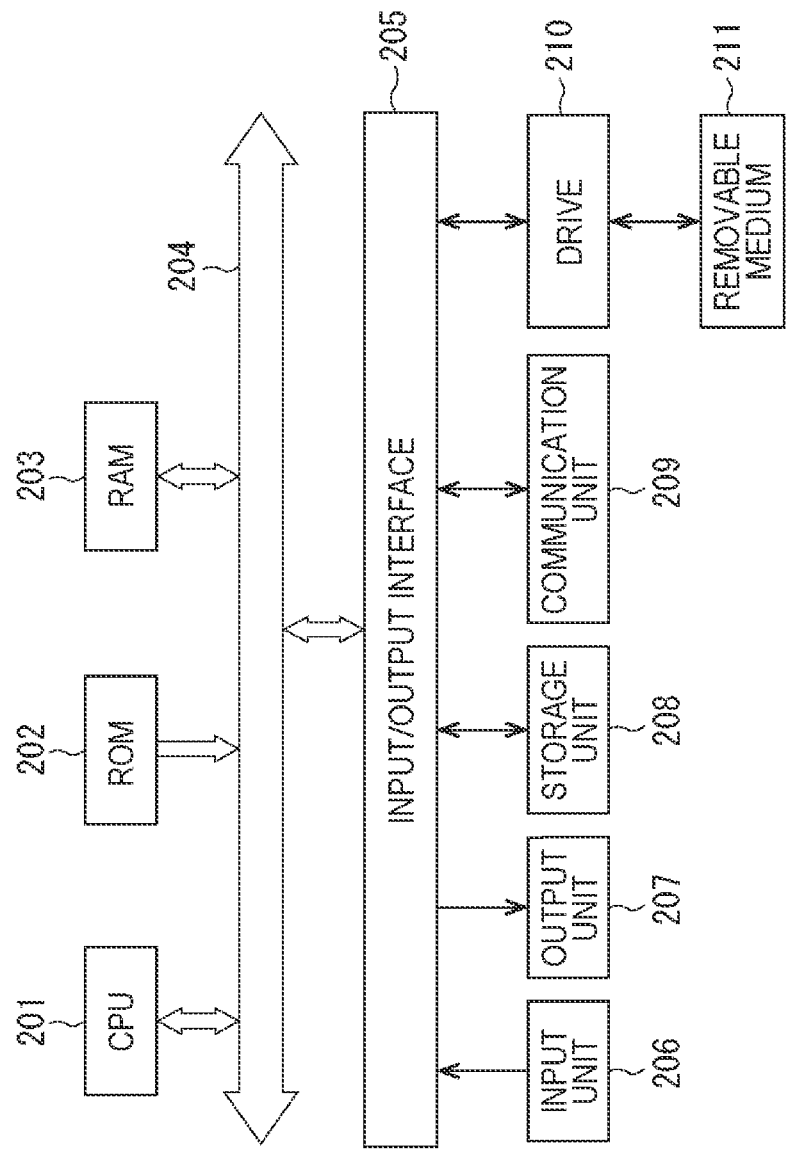
FIG. 17 is a block diagram illustrating a configuration example of a cloud game server.

FIG. 17 is a block diagram illustrating a configuration example of the cloud game server 1.

The cloud game server 1 is configured by a computer. The cloud game server 1 may include one computer having the configuration illustrated in FIG. 17 or may include a plurality of computers.

A CPU 201, a ROM 202, and a RAM 203 are connected to one another by a bus 204.

An input/output interface 205 is further connected to the bus 204. An input unit 206 including a keyboard, a mouse, and the like, and an output unit 207 including a display, a speaker, and the like are connected to the input/output interface 205. Furthermore, a storage unit 208 including a hard disk, a nonvolatile memory, and the like, a communication unit 209 including a network interface and the like, and a drive 210 that drives a removable medium 211 are connected to the input/output interface 205.

The communication quality information server 2 also has the same configuration as the configuration of the cloud game server 1 illustrated in FIG. 17. Hereinafter, the configuration illustrated in FIG. 17 will be appropriately described as the configuration of the communication quality information server 2.

Figure 18:
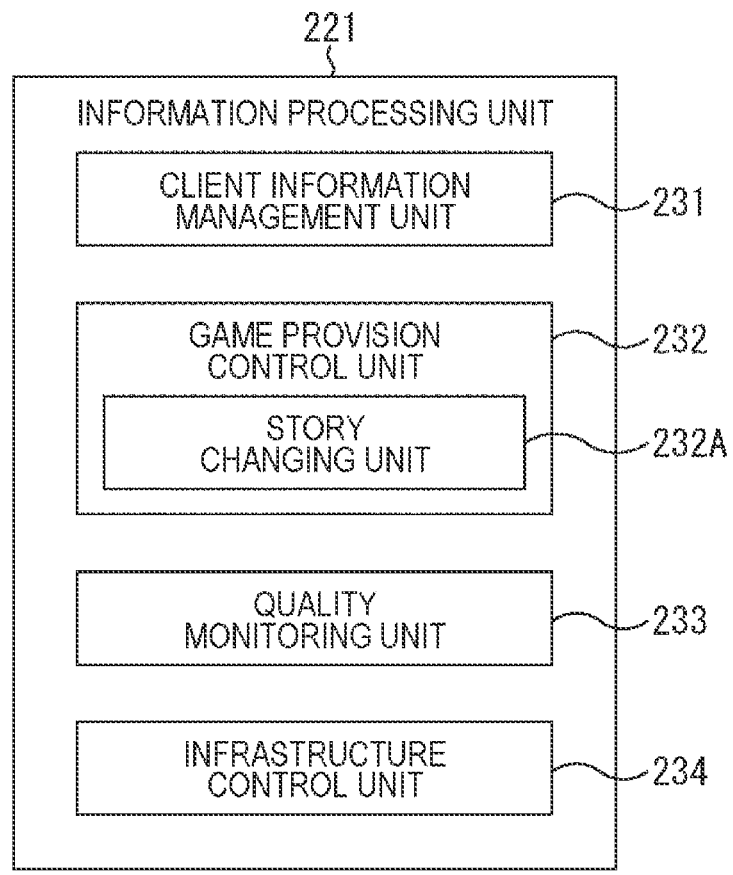
FIG. 18 is a block diagram illustrating a functional configuration example of a cloud game server.

FIG. 18 is a block diagram illustrating a functional configuration example of the cloud game server 1.

In the cloud game server 1, an information processing unit 221 is implemented. The information processing unit 221 includes a client information management unit 231, a game provision control unit 232, a quality monitoring unit 233, and an infrastructure control unit 234. At least a part of the functional units illustrated in FIG. 18 is implemented by executing a predetermined program by the CPU 201 in FIG. 17.

The client information management unit 231 manages the status and the like of the client terminal 31 on the basis of the client information transmitted from the client terminal 31.

The game provision control unit 232 controls provision of a cloud game. For example, the game provision control unit 232 generates a game video of the cloud game being executed in the client terminal 31 and transmits the game video to the client terminal 31. Furthermore, the game provision control unit 232 controls the progress of the game on the basis of the operation command or the like transmitted from the client terminal 31. The processing in steps S42 and S43 in FIG. 7 is processing performed by the game provision control unit 232.

In the game provision control unit 232, a story changing unit 232A is implemented. As described above, the story changing unit 232A changes the game story in a case where the game experience quality of the client terminal 31 is deteriorated. The processing in step S49 in FIG. 8 is processing performed by the story changing unit 232A.

The quality monitoring unit 233 monitors the communication quality and the game experience quality of the client terminal 31 on the basis of the communication quality information transmitted from the client terminal 31. Furthermore, the quality monitoring unit 233 monitors the operation status of the radio base station 21 and the operation status of the edge server 22 on the basis of the operation status information transmitted from the radio base station 21. The processing in steps S45 and S48 in FIG. 7 is processing performed by the quality monitoring unit 233.

In a case where the user of the client terminal 31 moves to the movement proposal spot by the proposal from the cloud game server 1 side, the infrastructure control unit 234 controls the network infrastructure such as allocating calculation resources to the edge server 22 that manages the movement proposal spot or the like. The processing in step S52 in FIG. 8 is processing performed by the infrastructure control unit 234.

<Configuration of Communication Quality Information Server 2>

Figure 19:
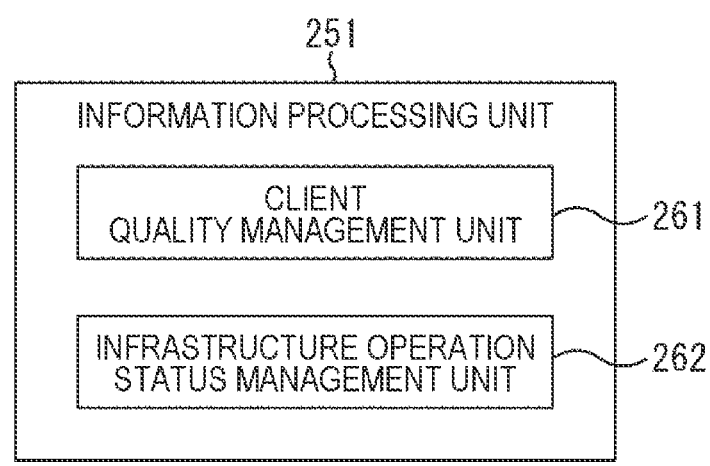
FIG. 19 is a block diagram illustrating a functional configuration example of a communication quality information server.

FIG. 19 is a block diagram illustrating a functional configuration example of the communication quality information server 2.

In the communication quality information server 2, an information processing unit 251 is implemented. The information processing unit 251 includes a client quality management unit 261 and an infrastructure operation status management unit 262. At least a part of the functional units illustrated in FIG. 19 is implemented by executing a predetermined program by the CPU 201 of FIG. 17 constituting the communication quality information server 2.

The client quality management unit 261 acquires the communication quality information transmitted from the client terminal 31, and manages the communication quality and the game experience quality of the client terminal 31. The client quality management unit 261 transmits the communication quality information transmitted from the client terminal 31 to the cloud game server 1. The processing in step S31 in FIG. 7 is processing performed by the client quality management unit 261.

The infrastructure operation status management unit 262 acquires the operation status information transmitted from the radio base station 21 and manages the operation status of the radio base station 21 and the operation status of the edge server 22. The infrastructure operation status management unit 262 transmits the communication quality information transmitted from the radio base station 21 to the cloud game server 1. The processing in steps S32 and S33 in FIG. 7 is processing performed by the infrastructure operation status management unit 262.

<<Modifications>>

In a case where the game experience quality in the client terminal 31 is deteriorated, the story is changed so as to move to the communication area where higher communication quality can be secured. However, in a case where the game experience quality is not poor and the communication quality is excessive, the story may be changed so as to move to the communication area with lower communication quality.

High communication quality may not be required depending on a game type, a game scene, or the like. By moving a user who does not need high communication quality to a communication area with lower communication quality by changing the story and moving a user who needs high communication quality to a communication area with higher communication quality by changing the story, it is possible to optimize the overall resource allocation.

Example of Program

The above-described series of processing can be executed by hardware or software. In a case where the series of processing is executed by software, a program constituting the software is installed in a computer incorporated in dedicated hardware, a general-purpose personal computer, or the like.

The program to be installed is provided by being recorded in the removable medium 211 including an optical disk (compact disc-read only memory (CD-ROM), digital versatile disc (DVD), and the like), a semiconductor memory, or the like. Furthermore, the program may be provided via a wired or wireless transmission medium such as a local area network, the Internet, or digital broadcasting. The program can be installed in the ROM 202 or the storage unit 208 in advance.

The program executed by the computer may be a program in which processing is performed in time series in the order described in the present specification, or may be a program in which processing is performed in parallel or at necessary timing such as when a call is made or the like.

In the present specification, a system means a set of a plurality of components (devices, modules (parts), or the like), and it does not matter whether or not all the components are in the same housing. Therefore, a plurality of devices housed in separate housings and connected via a network and one device in which a plurality of modules is housed in one housing are both systems.

Note that the effects described in the present specification are merely examples and are not limited, and other effects may be provided.

The embodiments of the present technology are not limited to the above-described embodiments, and various modifications can be made without departing from the gist of the present technology.

For example, the present technology can have a configuration of cloud computing in which one function is shared and processed in cooperation by a plurality of devices via a network.

Furthermore, each step described in the above-described flowcharts can be executed by one device or can be shared and executed by a plurality of devices.

Moreover, in a case where a plurality of processes is included in one step, the plurality of processes included in the one step can be executed by one device or can be shared and executed by a plurality of devices.

Example of Combination of Configurations

The present technology can also have the following configurations.

(1)
An information processing device including:
a communication unit that transmits and receives data related to a game to and from a wireless communication terminal that executes an application program of the game using a mobile communication system; and
a game provision control unit that changes a story that defines progress of the game according to quality of wireless communication in a communication area in which the wireless communication terminal is present.

(2)
The information processing device according to (1),
in which the game is a game that progresses using position information of a user of the wireless communication terminal, and
the game provision control unit changes the story to move the user to another communication area.

(3)
 The information processing device according to (2),
  in which the game provision control unit changes the story to move the user to the another communication area having a higher quality of wireless communication than the communication area in which the wireless communication terminal is present.

(4)
 The information processing device according to (2) or (3),
  in which the game provision control unit changes the story to generate an event at a position in a game space corresponding to a position in the another communication area.

(5)
 The information processing device according to (3) or (4), further including
  a monitoring unit that monitors quality of wireless communication in each communication area on the basis of information transmitted from a network device constituting the mobile communication system,
  in which the game provision control unit selects the another communication area as a movement destination from among communication areas in which quality of wireless communication is monitored.

(6)
 The information processing device according to any one of (1) to (5),
  in which the game provision control unit changes the story according to deterioration of experience quality of the game that changes depending on quality of wireless communication.

(7)
 The information processing device according to any one of (2) to (5), further including
  a control unit that controls allocation of a resource to a network device that manages wireless communication in the another communication area as a movement destination in a case where the user moves to the another communication area in response to a change of the story.

(8)
 An information processing method in which
 an information processing device is configured to:
 transmit and receive data related to a game to and from a wireless communication terminal that executes an application program of the game using a mobile communication system; and
 change a story that defines progress of the game according to quality of wireless communication in a communication area in which the wireless communication terminal is present.

(9)
 A wireless communication terminal including:
 a communication unit that transmits and receives data related to a game to and from an information processing device that manages provision of the game using a mobile communication system; and
 a game execution control unit that progresses the game defined by a story after a change according to the change of the story performed by the information processing device according to quality of wireless communication used for transmission and reception of the data related to the game.

(10)
 The wireless communication terminal according to (9),
  in which the game is a game that progresses using position information of a user of the wireless communication terminal, and
  the game execution control unit progresses the game according to the change of the story performed to move the user to another communication area.

(11)
 The wireless communication terminal according to (10),
  in which the game execution control unit progresses the game in accordance with the change of the story performed to move the user to the another communication area having a higher quality of wireless communication than a communication area in which the wireless communication terminal is present.

(12)
 The wireless communication terminal according to (10) or (11),
  in which the game execution control unit generates an event at a position in a game space corresponding to a position in the another communication area.

(13)
 The wireless communication terminal according to any one of (9) to (12), further including
  a communication quality acquisition unit that acquires quality of wireless communication in a communication area in which the wireless communication terminal is present and causes the information processing device to transmit communication quality information indicating the quality acquired.

(14)
 An information processing method in which
 a wireless communication terminal is configured to:
 transmit and receive data related to a game to and from an information processing device that manages provision of the game using a mobile communication system; and
 progress the game defined by a story after a change according to the change of the story performed by the information processing device according to quality of wireless communication used for transmission and reception of the data related to the game.

REFERENCE SIGNS LIST

1 Cloud game server
2 Communication quality information server
21-1, 21-2 Radio base station
22-1, 22-2 Edge server
31 Client terminal
111 Information processing unit
121 Client information generation unit
122 Game execution control unit
123 Quality acquisition unit
124 Communication control unit
221 Information processing unit
231 Client information management unit
232 Game provision control unit
233 Quality monitoring unit
234 Infrastructure control unit
251 Information processing unit
261 Client quality management unit
262 Infrastructure operation status management unit

The invention claimed is:

1. An information processing device, comprising:
a central processing unit (CPU) configured to:
transmit, through a network, data associated with a game to a wireless communication terminal, wherein the wireless communication terminal executes an application program of the game based on a mobile communication system;
receive, through the network, information associated with communication quality of a first communication area from the wireless communication terminal based on the transmitted data, wherein the wireless communication terminal is present in the first communication area;
change a story based on the received information associated with the communication quality of the first communication area, wherein the changed story corresponds to a progress of the game;
receive, through the network, an operation status of a radio base station associated with the wireless communication terminal and an operation status of an edge server associated with the wireless communication terminal; and
select a second communication area from a plurality of communication areas based on the changed story, the operation status of the radio base station, and the operation status of the edge server, wherein
the selected second communication area is different from the first communication area, and
the plurality of communication areas includes the first communication area.

2. The information processing device according to claim 1, wherein
the wireless communication terminal progresses the game based on position information of a user of the wireless communication terminal, and
a movement of the user to the second communication area is based on the changed story.

3. The information processing device according to claim 2, wherein a communication quality of the selected second communication area is higher than the communication quality of the first communication area.

4. The information processing device according to claim 2, wherein
the CPU is further configured to generate, based on the changed story, an event at a position in a game space, and
the game space corresponds to the selected second communication area.

5. The information processing device according to claim 2, wherein
the CPU is further configured to control allocation of a resource to the edge server, and
the edge server manages wireless communication in the selected second communication area.

6. The information processing device according to claim 1, wherein
the CPU is further configured to:
determine, based on the received information associated with the communication quality of the first communication area, a deterioration of experience quality of the game; and
change the story based on the determined deterioration of the experience quality of the game, and
the determined deterioration of the experience quality of the game is variable based on the communication quality of the first communication area.

7. An information processing method, comprising:
in an information processing device:
transmitting, by a central processing unit (CPU), through a network, data associated with a game to a wireless communication terminal, wherein the wireless communication terminal executes an application program of the game based on a mobile communication system;
receiving, by the CPU, through the network, information associated with communication quality of a first communication area from the wireless communication terminal based on the transmitted data, wherein the wireless communication terminal is present in the first communication area;
changing, by the CPU, a story based on the received information associated with the communication quality of the first communication area, wherein the changed story corresponds to a progress of the game;
receiving, by the CPU, through the network, an operation status of a radio base station associated with the wireless communication terminal and an operation status of an edge server associated with the wireless communication terminal; and
selecting, by the CPU, a second communication area from a plurality of communication areas based on the changed story, the operation status of the radio base station, and the operation status of the edge server, wherein
the selected second communication area is different from the first communication area, and
the plurality of communication areas includes the first communication area.

8. A wireless communication terminal, comprising:
a central processing unit (CPU) configured to:
receive, through a network, data associated with a game from an information processing device, wherein the information processing device manages provision of the game based on a mobile communication system;
transmit, through the network, information associated with communication quality of a first communication area to the information processing device based on the received data, wherein
the information processing device changes a story based on the information associated with the communication quality of the first communication area,
the information processing device selects a second communication area from a plurality of communication areas based on the changed story, an operation status of a radio base station associated with the wireless communication terminal, and an operation status of an edge server associated with the wireless communication terminal,
the second communication area is different from the first communication area,
the plurality of communication areas includes the first communication area, and
the wireless communication terminal is present in the first communication area; and
progress the game based on the selected second communication area, wherein the changed story corresponds to the progression of the game.

9. The wireless communication terminal according to claim 8, wherein
the CPU is further configured to progress the game based on position information of a user of the wireless communication terminal, and a movement of the user to the selected second communication area is based on the changed story.

10. The wireless communication terminal according to claim 9, wherein a communication quality of the selected second communication area is higher than the communication quality of the first communication area.

11. The wireless communication terminal according to claim 9, wherein
the information processing device generates an event at a position in a game space based on the changed story,
the game space corresponds to the selected second communication area, and
the CPU is further configured to control a display screen of the wireless communication terminal to display the generated event.

12. An information processing method, comprising:
in a wireless communication terminal:
receiving, by a central processing unit (CPU), through a network, data associated with a game from an information processing device, wherein the information processing device manages provision of the game based on a mobile communication system;
transmitting, by the CPU, through the network, information associated with communication quality of a first communication area to the information processing device based on the received data, wherein
the information processing device changes a story based on the information associated with the communication quality of the first communication area,
the information processing device selects a second communication area from a plurality of communication areas based on the changed story, an operation status of a radio base station associated with the wireless communication terminal, and an operation status of an edge server associated with the wireless communication terminal,
the second communication area is different from the first communication area,
the plurality of communication areas includes the first communication area, and
the wireless communication terminal is present in the first communication area; and
progressing, by the CPU, the game based on the selected second communication area, wherein the changed story corresponds to the progression of the game.

* * * * *